United States Patent
Sutavani et al.

(10) Patent No.: US 11,360,197 B2
(45) Date of Patent: Jun. 14, 2022

(54) CALIBRATION OF SENSOR SYSTEMS

(71) Applicant: LUMINAR, LLC, Orlando, FL (US)

(72) Inventors: Amey Sutavani, Mountain View, CA (US); Lekha Walajapet Mohan, Palo Alto, CA (US); Benjamin Englard, Palo Alto, CA (US)

(73) Assignee: Luminar, LLC, Orlando, FL (US)

( * ) Notice: Subject to any disclaimer, the term of this patent is extended or adjusted under 35 U.S.C. 154(b) by 38 days.

(21) Appl. No.: 16/869,506

(22) Filed: May 7, 2020

(65) Prior Publication Data

US 2021/0208263 A1 Jul. 8, 2021

Related U.S. Application Data

(60) Provisional application No. 62/958,157, filed on Jan. 7, 2020.

(51) Int. Cl.
*G01S 7/497* (2006.01)
*G01S 17/931* (2020.01)
*G01S 17/86* (2020.01)
*G01S 17/42* (2006.01)

(52) U.S. Cl.
CPC .......... *G01S 7/4972* (2013.01); *G01S 17/42* (2013.01); *G01S 17/86* (2020.01); *G01S 17/931* (2020.01)

(58) Field of Classification Search
CPC ........ G01S 17/931; G01S 17/86; G01S 17/42; G01S 7/4972
See application file for complete search history.

(56) References Cited

U.S. PATENT DOCUMENTS

| | | | |
|---|---|---|---|
| 9,491,452 B2 | 11/2016 | Meloun | |
| 9,582,881 B2 | 2/2017 | Natroshvili | |
| 10,154,176 B1 | 12/2018 | Hicks et al. | |
| 10,241,198 B2 * | 3/2019 | LaChapelle | G01S 7/4868 |
| 2017/0272727 A1 | 9/2017 | Jiang et al. | |
| 2018/0249142 A1 | 8/2018 | Hicks et al. | |
| 2018/0313942 A1 | 11/2018 | Wu et al. | |
| 2019/0028688 A1 | 1/2019 | Kumar et al. | |

(Continued)

FOREIGN PATENT DOCUMENTS

| KR | 2019-0131413 | 11/2019 |
|---|---|---|
| WO | 2019/197894 | 10/2019 |

OTHER PUBLICATIONS

International Search Report and Written Opinion for corresponding PCT/US2021/012309 dated Apr. 28, 2021.

(Continued)

*Primary Examiner* — Bryan Bui

(57) ABSTRACT

A system includes multiple sensors having different, and overlapping, fields of regard and a controller communicatively coupled to sensors. Methods for calibrating the multiple sensors include obtaining data from the sensors, determining optimized transformation parameters for at least one of the sensors, and transforming the data from one sensor projection plane to the other sensor projection plane. The method is an iterative process that uses the metric of mutual information between the data sets, and transformed data sets of the sensors, to determine an optimized set of transformation parameters. The sensors may be a plurality of lidar sensors, a camera and a lidar sensor, or other sets of sensors.

30 Claims, 15 Drawing Sheets

(56) References Cited

U.S. PATENT DOCUMENTS

2019/0204425 A1    7/2019  Abari
2019/0293756 A1*   9/2019  Blaes .................... G01S 7/4026

OTHER PUBLICATIONS

Pandey et al., "Automatic Extrinsic Calibration of Vision and Lidar by Maximizing Mutual Information," Journal of Field Robotics, 32(5):696-722, 2015.

Scott et al., "Choosing a Time and Place for Calibration of Lidar-Camera Systems," IEEE International Conference on Robotics and Automation, Stockholm, Sweden, May 16-21, 2016.

Shams et al., "A Survey of Medical Image Registration on Multicore and the GPU," IEEE Signal Processing Magazine, pp. 50-60, Mar. 2010.

Scott et al., "Choosing a Time and Place for Calibration of Lidar-Camera Systems," 2016 IEEE International Conference on Robotics and Automation, (*ICRA*), 2016, pp. 4349-4356, doi: 10.1109/ICRA.2016.7487634.

\* cited by examiner

CALIBRATION OF SENSOR SYSTEMS

CROSS-REFERENCE TO RELATED APPLICATION

This application claims priority to provisional U.S. Application Ser. No. 62/958,157, filed on Jan. 7, 2020, titled "Calibration of Sensor Systems," the entire disclosure of which is hereby expressly incorporated by reference herein.

FIELD OF TECHNOLOGY

This disclosure generally relates to calibrating sensor systems, and, more particularly, optimizing transformations for combining data sets from different sensors for calibration of the sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-driving or "autonomous" vehicles generally employ sensors, such as light detection and ranging (lidar) devices, cameras, radars, etc. to detect or "see" the surrounding environment as the vehicles move toward their destinations. Such vehicles include self-driving control systems that process the sensor data and, based on both the sensed environment and the desired destination, determine which maneuvers and operational states (e.g., braking force, steering direction) are most appropriate on a more or less continuous basis throughout the trip. Typically, multiple sensing systems are employed on a single vehicle to detect targets, identify targets, and determine distances to targets (e.g., another vehicle, a pedestrian, a tree, edges of a road, etc.) for enabling self-driving of an autonomous vehicle.

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

Additionally, systems may employ multiple lidar systems or combine lidar systems with cameras or other imaging systems to determine distances to targets, identify targets, or combine data to for environment mapping and other object identification purposes.

SUMMARY

One example embodiment of the techniques of this disclosure is a computer-implemented method for processing data received from sensors of different types. The method includes receiving from a first sensor, first sensor data corresponding to an environment detected in a field of regard (FOR) of the first sensor. The method further includes receiving data, from a second sensor having a physical offset in position and/or orientation from the first sensor, second sensor data corresponding to the environment detected in a FOR of the second sensor, with the FORs of the first and second sensor being at least partially overlapping. Additionally, the method includes determining a set of transformation parameters for alignment of the first sensor data and the second sensor data. The determination of the set of transformation parameters includes iteratively modifying candidate transformation parameters in view of a metric of mutual information between the first sensor data and the second sensor data.

DETAILED DESCRIPTION

Figure 1:
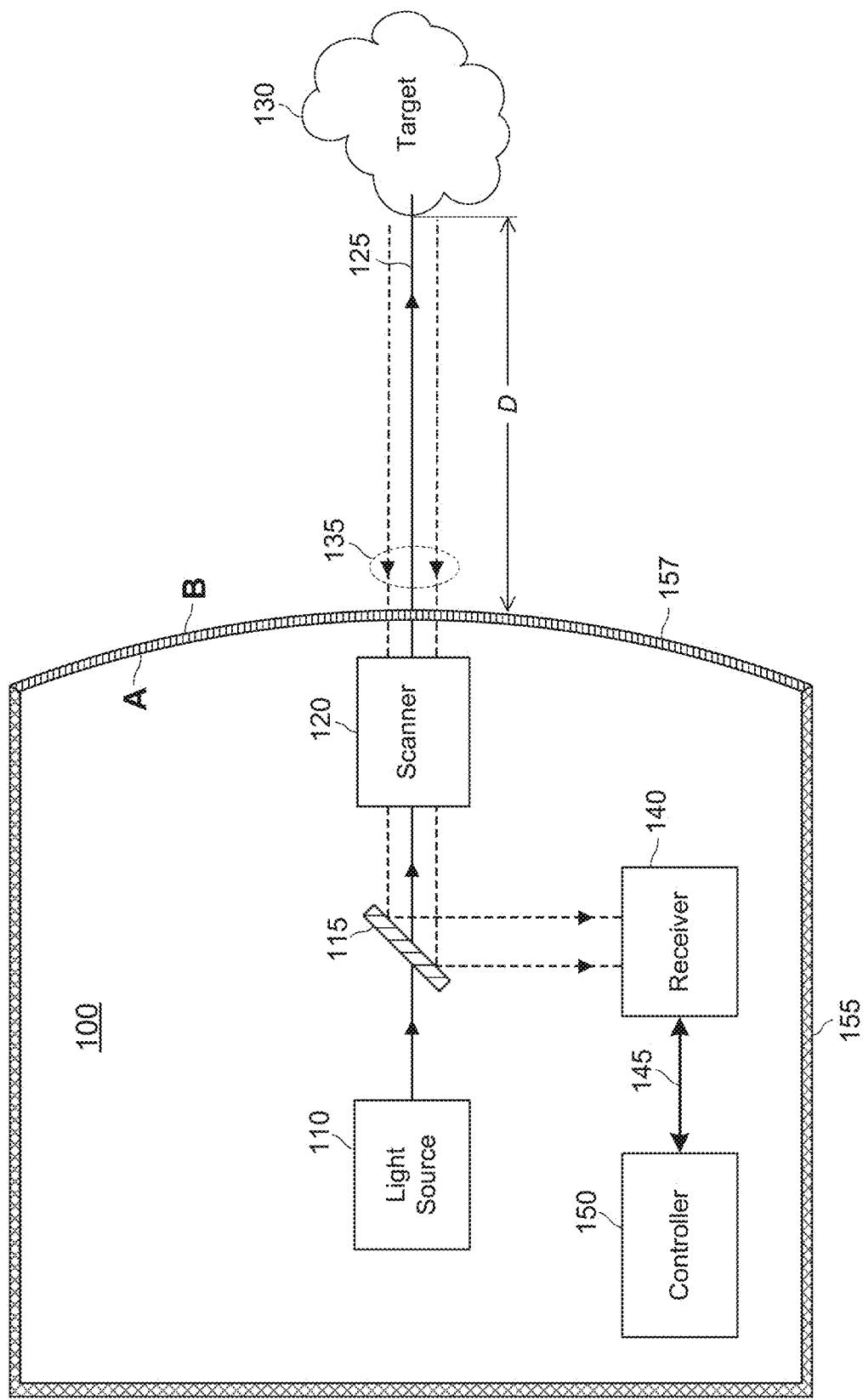
FIG. 1 is a block diagram of an example light detection and ranging (lidar) system in which at least some of the techniques of this disclosure can be implemented.

Generally speaking, the techniques of this disclosure allow a computer vision system equipped with multiple sensors to optimize data transformations for combining, merging, or registering, data from a plurality of sensors, and specifically for combining data from sensors that have a physical offset between their positions and/or angular orientations (i.e., sensors with different and overlapping fields of regard (FORs)). In other words, the sensors of the computer vision system sense the same portion of the environment in which the computer vision system operates from different respective vantage points. The computer vision system determines an optimized set of transformation parameters which, when applied to one of the sets of sensor data, yield alignment of the sets of the sensor data. As a result, the computer vision system can calibrate one sensor using the sensor data generated by another sensor so as to correctly overlap the sets of sensor data and improve the overall accuracy of perception and prediction, for example, to adjust operational parameters of one sensor in view of the output of the other sensor, or to determine if a sensor has changed alignment physically, and may automatically realign the sensor.

The computer vision system can operate in an autonomous ("self-driving") vehicle for example. In various implementations, the computer vision system performs a lidar-to-lidar calibration, a lidar-to-camera calibration, or calibration of transformations of another combination of sensors. When the two sensors are lidars, the computer vision system can seek spatial (x, y, z) and rotational (yaw, pitch, roll) alignment between three-dimensional (3D) tuples describing positions of points in a 3D point cloud. Additionally or alternatively, the computer vision system can determine an optimized transformation based on statistical analysis and alignment between intensity values of the points in the 3D point cloud using the spatial coordinates and corresponding intensity values i to generate tuples (x, y, z, i). The intensity values may be indicative of the reflectivity of an object in the field of regard of the lidar, and therefore the intensity values may be considered to be reflectivity values for objects and targets in the field of regard. In embodiments, two sensors may be a camera and a lidar and the computer vision system can determine optimized transformations from intensity values of pixels in a two-dimensional (2D) image and points in a 3D point cloud generated by the camera and the lidar, respectively, for combining data from the two detectors for autonomous driving applications. In addition to or instead of using intensity values, the computer vision system can use other features or channels of lidar data for calibration, such as for example, (i) surface normals or (ii) detections of the road surface or lane markings.

The computer vision system can generate candidate transformation parameters corresponding to translation (x, y, z) and rotation (yaw, pitch, roll) in a 3D space. The computer vision system can apply the transformation parameters to one of the sets of sensor data in an attempt to bring the set of sensor data, or a subset of the sensor data, into the frame of reference of the other set of sensor data. The computer vision system can then calculate mutual information (MI) of the first set of sensor data and the transformed second set of sensor data. To this end, the computer vision system can apply joint histograms, for example. The MI can be based on (x, y, z) coordinates, greyscale values, reflectivity values, intensity values, surface normals, and/or detections of road surface or lane markings. The computer vision system can apply these steps as a part of an iterative optimization technique so as to identify a set of transformation parameters that yield a metric of MI above a certain threshold for example, or until another exit condition is satisfied (e.g., meeting or exceeding a computational/time cost threshold of further iterations, reaching a maximum number of optimization iterations, meeting or exceeding cost difference between a current iteration and a previous iteration). Suitable techniques for determining a set of candidate transformation parameters for the next iteration include a Barzilai-Borwein method and a Nelder-Mead method for example.

The initial candidate transformation parameters may correspond to operator input received via a user interface, the result of a previous calibration process, or the result of a grid search for a certain acceptable amount of overlap between the FORs of the first and second sensors.

Further, in some implementations, the computer vision system can perform multiple transformations or projections on first and second sets of sensor data to transform the first and second sets of data onto corresponding projection planes. The computer vision system then determines the MI of each transformed set of data, in each plane, to find the "best" (i.e., satisfying a certain metric of acceptability such as a MI threshold value) transform or projection plane for merging of the first and second data sets. The computer vision system in some cases can exclude dynamic objects such as cars or pedestrians so as to isolate, and only consider, static objects during the transformation optimization. Additionally, the computer vision system in some implementations obtains sensor data for the calibration process outlined above, only during periods of time when the vehicle is stationary.

Example applications of the output of this technique include merging of sensor data from a plurality of sensors, presenting the merged data graphically via a user interface, providing the merged data to a controller (which may assist in autonomous vehicle operations), determining the health of the first and/or second sensor in view of the determined set of transformation parameters, determining spatial shifts or alignment changes of the first and/or second sensor over time, and determining whether a manual or automatic physical realignment of the first and/or second sensor is required.

To efficiently use a conventional camera along with a lidar in a vehicle, or multiple lidar systems in a vehicle, the system of this disclosure synchronizes the data from the camera and the lidar, or the plurality of lidar systems, in view of the scan pattern of the lidar. In particular, in embodiments with a camera and a lidar, the system causes the camera to capture photographic images at a certain rate to generate N photographs while the lidar system scans the entire field of regard once to generate one scan frame. The system then aligns pixels (or sets of pixels) in the photographic images with the corresponding pixels in the scan frame, so that one lidar pixel in a certain frame is aligned with the corresponding pixels in one photograph, and another lidar pixel in the same frame is aligned with the corresponding pixels in another photograph. In this manner, the system accounts for the displacement of the vehicle that occurs while the lidar completes the scan of one scan frame. Additionally, the system and methods account for difference in FORs of the lidar and camera. Similarly, the methods and systems can perform alignment and combination, merging, or registering, of data from two lidar detectors.

Figure 4:
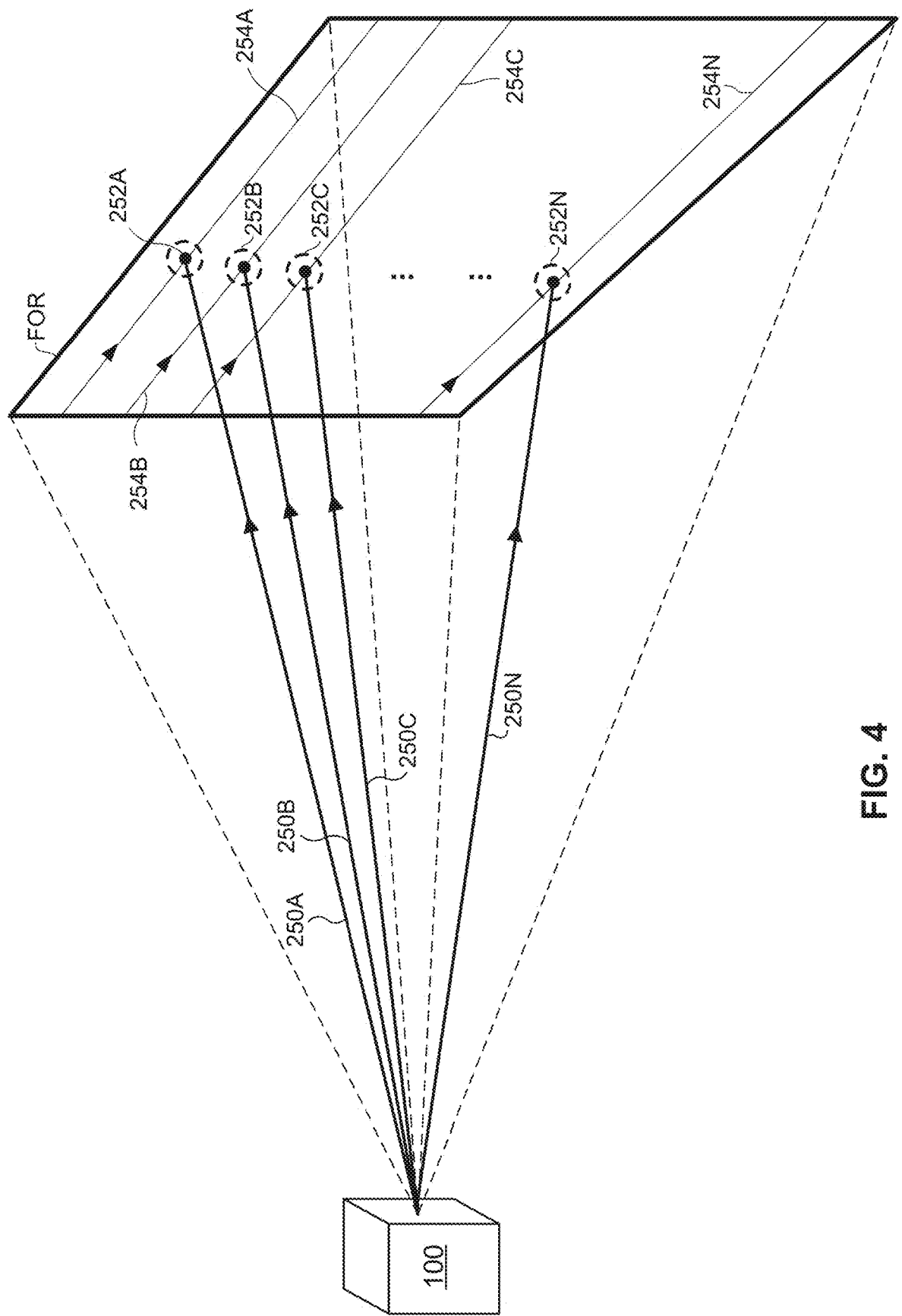
FIG. 4 illustrates an example scan pattern which the lidar system of FIG. 1 can produce when identifying targets within a field of regard using multiple channels.
Figure 5:
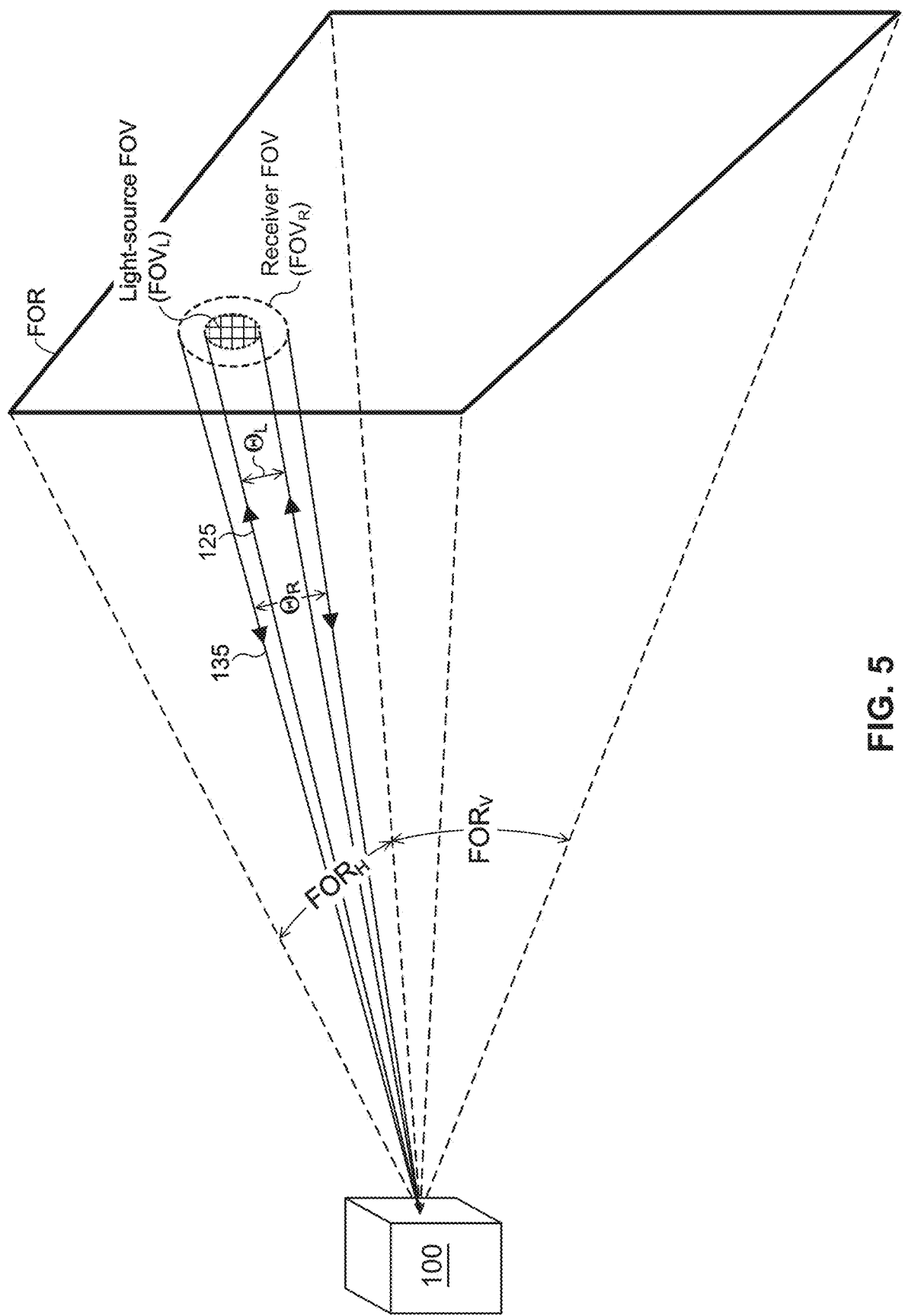
FIG. 5 schematically illustrates fields of view (FOVs) of a light source and a detector that can operate in the lidar system of FIG. 1.
Figure 6A:
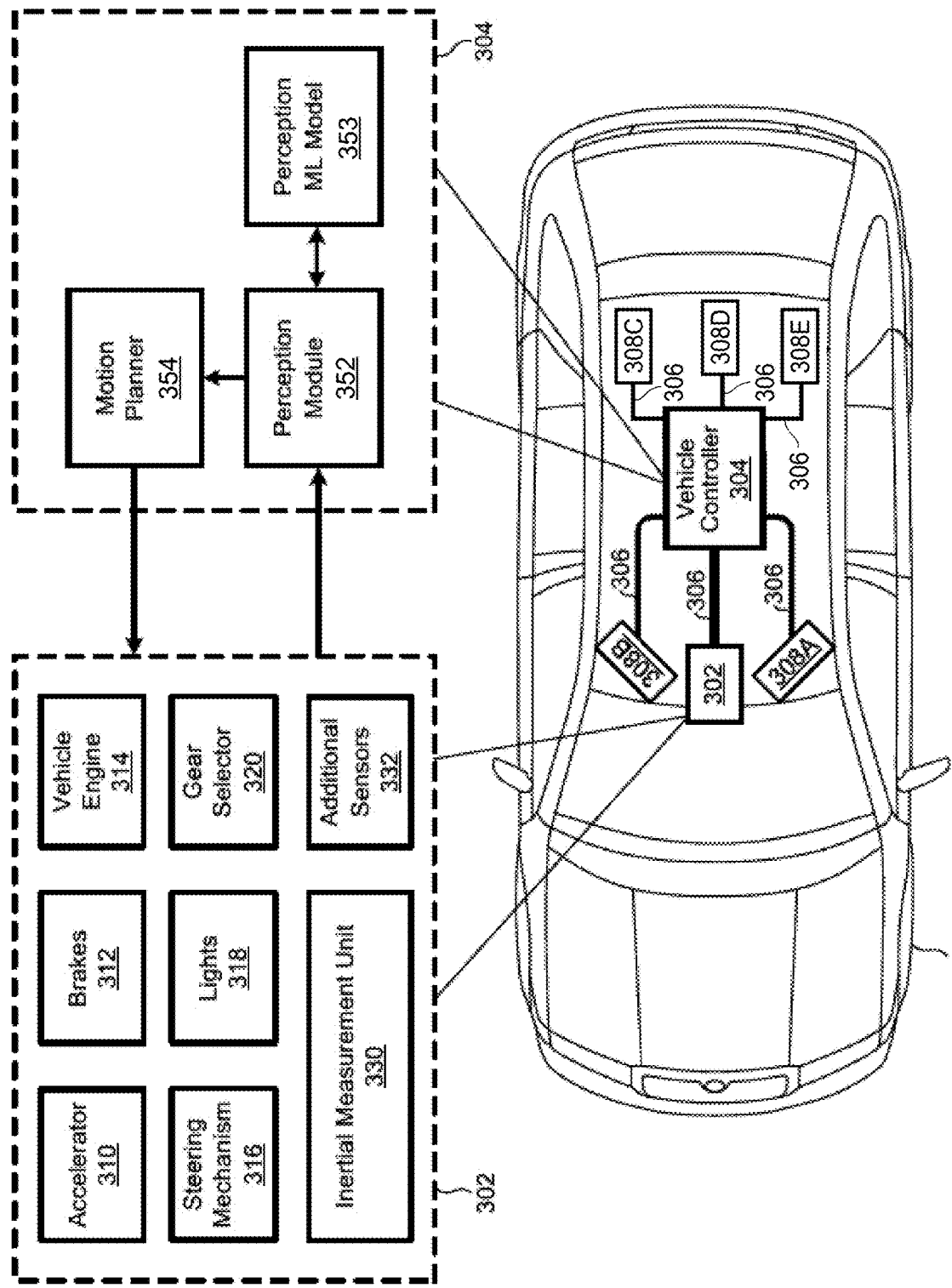
FIG. 6A illustrates an example autonomous vehicle, with multiple sensors, in which a controller can operate various components for maneuvering and operating the vehicle.
Figure 6B:
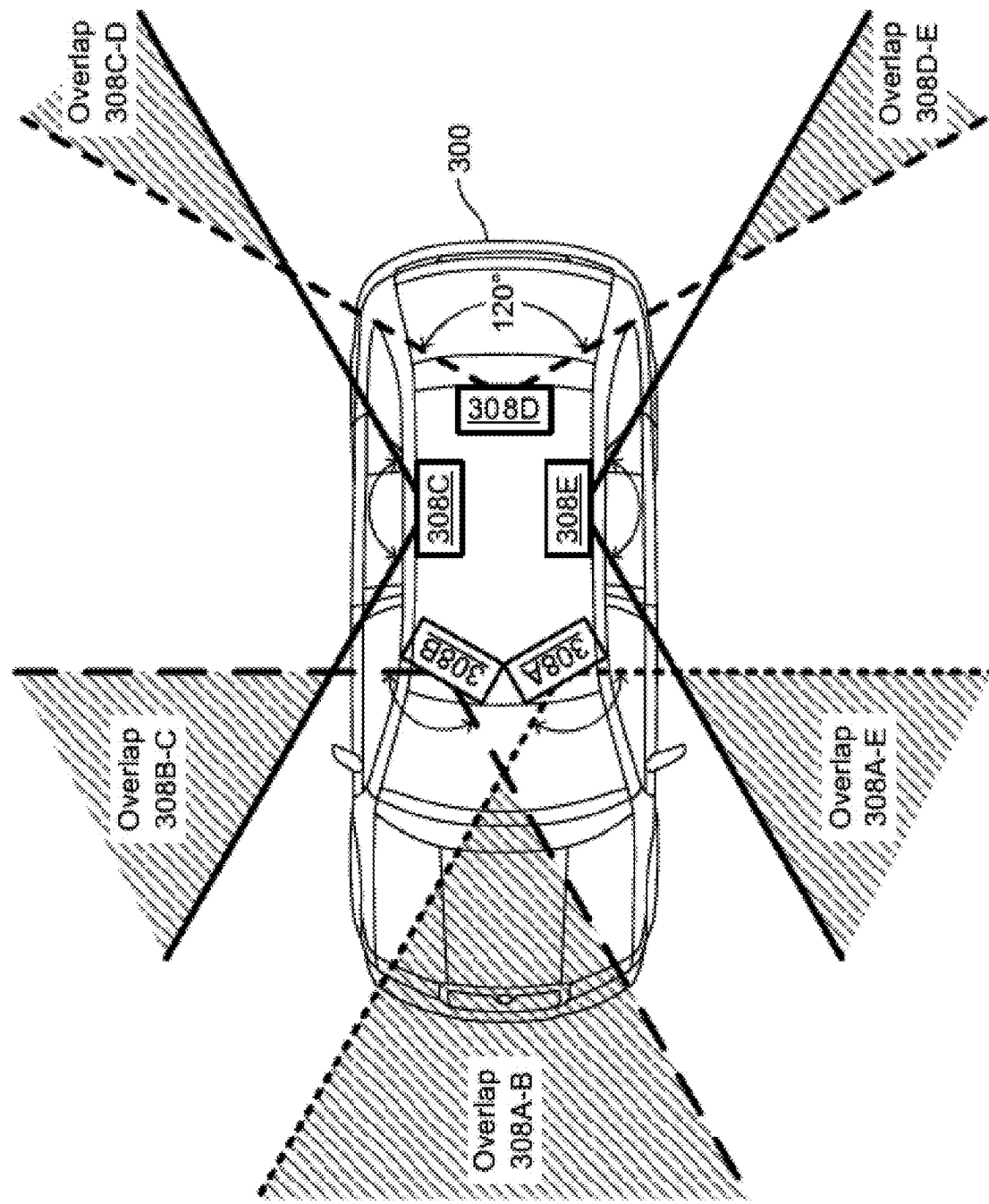
FIG. 6B illustrates an example autonomous vehicle, with multiple sensors having different fields of regard, and overlapping fields of regard.
Figure 7:
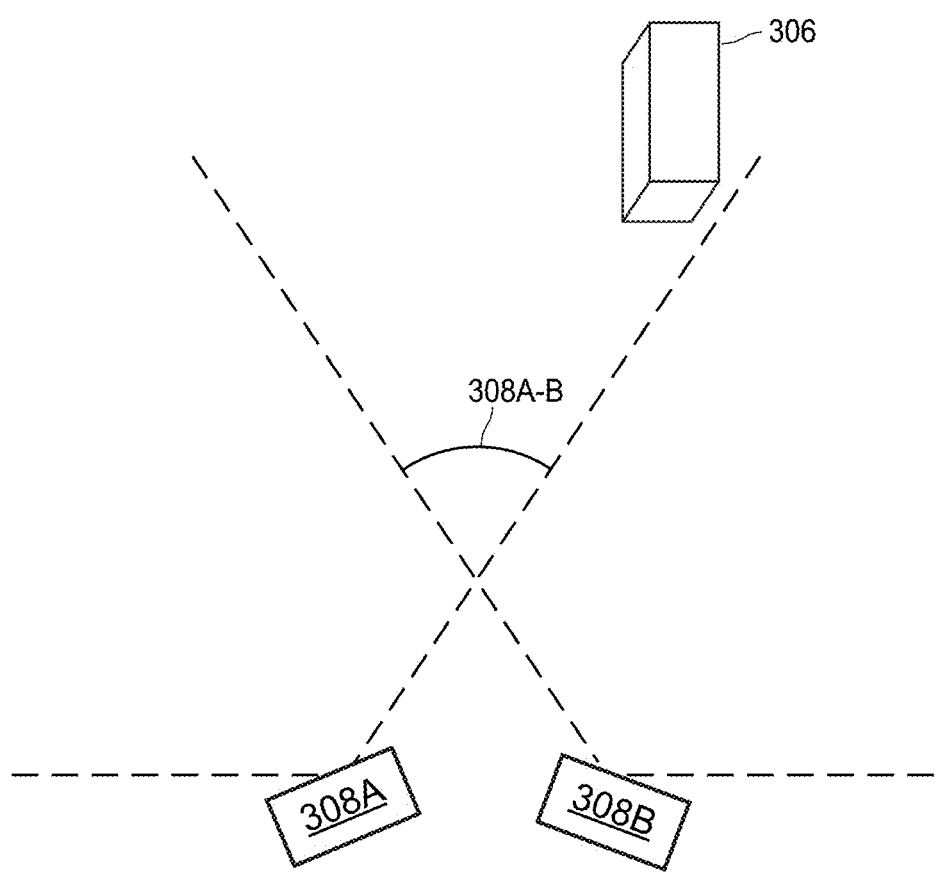
FIG. 7 illustrates the overlap region of two sensors having different fields of regard.

An example lidar system in which these techniques can be implemented is considered next with reference to FIGS. 1-5, followed by example geometries of sensors for detecting an environment relative to a vehicle (FIGS. 6A, 6B, and 7). Example methods and systems for optimizing transformation parameters for combining data from multiple sensors with different fields of regard are then discussed in reference to FIGS. 8 and 9. Followed by discussions of examples of methods and systems for combining data from, and calibration, two lidar sensors (FIGS. 8, and 10-11B) and examples of methods and systems for combining data, and calibrating, a camera-lidar sensor systems (FIGS. 12-14C).

System Overview

FIG. 1 illustrates an example light detection and ranging (lidar) system 100. The lidar system 100 may be referred to as a laser ranging system, a laser radar system, a LIDAR system, a lidar sensor, or a laser detection and ranging (LADAR or ladar) system. The lidar system 100 may include a light source 110, a mirror 115, a scanner 120, a receiver 140, and a controller 150. The light source 110 may be, for example, a laser which emits light having a particular operating wavelength in the infrared, visible, or ultraviolet portions of the electromagnetic spectrum. As a more specific example, the light source 110 may include a laser with an operating wavelength between approximately 1.2 µm and 1.7 µm.

In operation, the light source 110 emits an output beam of light 125 which may be continuous-wave, pulsed, or modulated in any suitable manner for a given application. The output beam of light 125 is directed downrange toward a remote target 130 located a distance D from the lidar system 100 and at least partially contained within a field of regard of the system 100. Depending on the scenario and/or the implementation of the lidar system 100, D can be between 1 m and 1 km, for example.

Once the output beam 125 reaches the downrange target 130, the target 130 may scatter or, in some cases, reflect at least a portion of light from the output beam 125, and some of the scattered or reflected light may return toward the lidar system 100. In the example of FIG. 1, the scattered or reflected light is represented by input beam 135, which passes through the scanner 120, which may be referred to as a beam scanner, optical scanner, or laser scanner. The input beam 135 passes through the scanner 120 to the mirror 115, which may be referred to as an overlap mirror, superposition mirror, or beam-combiner mirror. The mirror 115 in turn directs the input beam 135 to the receiver 140. The input 135 may contain only a relatively small fraction of the light from the output beam 125. For example, the ratio of average power, peak power, or pulse energy of the input beam 135 to average power, peak power, or pulse energy of the output beam 125 may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam 125 has a pulse energy of 1 microjoule (µJ), then the pulse energy of a corresponding pulse of the input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ.

The output beam 125 may be referred to as a laser beam, light beam, optical beam, emitted beam, or just beam; and the input beam 135 may be referred to as a return beam, received beam, return light, received light, input light, scattered light, or reflected light. As used herein, scattered light may refer to light that is scattered or reflected by the target 130. The input beam 135 may include light from the output beam 125 that is scattered by the target 130, light from the output beam 125 that is reflected by the target 130, or a combination of scattered and reflected light from target 130.

The operating wavelength of a lidar system 100 may lie, for example, in the infrared, visible, or ultraviolet portions of the electromagnetic spectrum. The Sun also produces light in these wavelength ranges, and thus sunlight can act as background noise, which can obscure signal light detected by the lidar system 100. This solar background noise can result in false-positive detections or can otherwise corrupt measurements of the lidar system 100, especially when the receiver 140 includes SPAD detectors (which can be highly sensitive).

Generally speaking, the light from the Sun that passes through the Earth's atmosphere and reaches a terrestrial-based lidar system such as the system 100 can establish an optical background noise floor for this system. Thus, in order for a signal from the lidar system 100 to be detectable, the signal must rise above the background noise floor. It is generally possible to increase the signal-to-noise (SNR) ratio of the lidar system 100 by raising the power level of the output beam 125, but in some situations it may be desirable to keep the power level of the output beam 125 relatively low. For example, increasing transmit power levels of the output beam 125 can result in the lidar system 100 not being eye-safe.

In some implementations, the lidar system 100 operates at frequencies at which atmospheric absorption is relatively low. For example, the lidar system 100 can operate at wavelengths in the approximate ranges from 980 nm to 1110 nm or from 1165 nm to 1400 nm.

In other implementations, the lidar system 100 operates at frequencies at which atmospheric absorption is high. For example, the lidar system 100 can operate at wavelengths in the approximate ranges from 930 nm to 980 nm, from 1100 nm to 1165 nm, or from 1400 nm to 1460 nm.

According to some implementations, the lidar system 100 can include an eye-safe laser. An eye-safe laser may refer to a laser with an emission wavelength, average power, peak power, peak intensity, pulse energy, beam size, beam divergence, or exposure time such that emitted light from the laser presents little or no possibility of causing damage to a person's eyes. For example, the light source 110 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In some implementations, the light source 110 may include an eye-safe laser (e.g., a Class 1 or a Class I laser) configured to operate at any suitable wavelength between approximately 1400 nm and approximately 2100 nm. In some implementations, the light source 110 may include an eye-safe laser with an operating wavelength between approximately 1400 nm and approximately 1600 nm. In some implementations, the light source 110 may include an eye-safe laser with an operating wavelength between approximately 1530 nm and approximately 1560 nm. In some implementations, the light source 110 may include an eye-safe fiber laser or solid-state laser with an operating wavelength between approximately 1400 nm and approximately 1600 nm.

The receiver 140 may receive or detect photons from the input beam 135 and generate one or more representative signals. For example, the receiver 140 may generate an output electrical signal 145 that is representative of the input beam 135. The receiver may send the electrical signal 145 to the controller 150. Depending on the implementation, the controller 150 may include one or more processors, a memory module, an application-specific integrated circuit (ASIC), a field-programmable gate array (FPGA), and/or other suitable circuitry configured to analyze one or more characteristics of the electrical signal 145 to determine one or more characteristics of the target 130, such as its distance downrange from the lidar system 100. More particularly, the controller 150 may analyze the time of flight or phase modulation for the beam of light 125 transmitted by the light source 110. If the lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D = c \cdot T/2$, where c is the speed of light (approximately $3.0 \times 10^8$ m/s).

As a more specific example, if the lidar system 100 measures the time of flight to be T=300 ns, then the lidar system 100 can determine the distance from the target 130 to the lidar system 100 to be approximately D=45.0 m. As another example, the lidar system 100 measures the time of flight to be T=1.33 µs and accordingly determines that the distance from the target 130 to the lidar system 100 is approximately D=199.5 m. The distance D from lidar system 100 to the target 130 may be referred to as a distance, depth, or range of the target 130. As used herein, the speed of light c refers to the speed of light in any suitable medium, such as for example in air, water, or vacuum. The speed of light in vacuum is approximately $2.9979 \times 10^8$ m/s, and the speed of light in air (which has a refractive index of approximately 1.0003) is approximately $2.9970 \times 10^8$ m/s.

The target 130 may be located a distance D from the lidar system 100 that is less than or equal to a maximum range $R_{MAX}$ of the lidar system 100. The maximum range $R_{MAX}$ (which also may be referred to as a maximum distance) of a lidar system 100 may correspond to the maximum distance over which the lidar system 100 is configured to sense or identify targets that appear in a field of regard of the lidar system 100. The maximum range of lidar system 100 may be any suitable distance, such as for example, 25 m, 50 m, 100 m, 200 m, 500 m, or 1 km. As a specific example, a lidar system with a 200-m maximum range may be configured to sense or identify various targets located up to 200 m away. For a lidar system with a 200-m maximum range ($R_{MAX}$=200 m), the time of flight corresponding to the maximum range is approximately $2 \cdot R_{MAX}/c \cong 1.33$ µs.

In some implementations, the light source 110, the scanner 120, and the receiver 140 may be packaged together within a single housing 155, which may be a box, case, or enclosure that holds or contains all or part of a lidar system 100. The housing 155 includes a window 157 through which the beams 125 and 135 pass. In one example implementation, the lidar-system housing 155 contains the light source 110, the overlap mirror 115, the scanner 120, and the receiver 140 of a lidar system 100. The controller 150 may reside within the same housing 155 as the components 110, 120, and 140, or the controller 150 may reside remotely from the housing.

Moreover, in some implementations, the housing 155 includes multiple lidar sensors, each including a respective scanner and a receiver. Depending on the particular implementation, each of the multiple sensors can include a separate light source or a common light source. The multiple sensors can be configured to cover non-overlapping adjacent FORs or partially overlapping FORs, depending on the implementation.

The housing 155 may be an airtight or watertight structure that prevents water vapor, liquid water, dirt, dust, or other contaminants from getting inside the housing 155. The housing 155 may be filled with a dry or inert gas, such as for example dry air, nitrogen, or argon. The housing 155 may include one or more electrical connections for conveying electrical power or electrical signals to and/or from the housing.

The window 157 may be made from any suitable substrate material, such as for example, glass or plastic (e.g., polycarbonate, acrylic, cyclic-olefin polymer, or cyclic-olefin copolymer). The window 157 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 µm) and particular refractive indices. A dielectric coating may be deposited onto surface A or surface B of the window 157 using any suitable deposition technique, such as for example, sputtering or electron-beam deposition.

The dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. For example, a dichroic coating may have a reflectivity of less than or equal to 0.5% at approximately 1550-1560 nm and a reflectivity of greater than or equal to 90% at approximately 800-1500 nm.

In some implementations, surface A or surface B has a dielectric coating that is anti-reflecting at an operating wavelength of one or more light sources 110 contained within enclosure 850. An AR coating on surface A and surface B may increase the amount of light at an operating wavelength of light source 110 that is transmitted through the window 157. Additionally, an AR coating at an operating wavelength of the light source 110 may reduce the amount of incident light from output beam 125 that is reflected by the window 157 back into the housing 155. In an example implementation, each of surface A and surface B has an AR coating with reflectivity less than 0.5% at an operating wavelength of light source 110. As an example, if the light source 110 has an operating wavelength of approximately 1550 nm, then surface A and surface B may each have an AR coating with a reflectivity that is less than 0.5% from approximately 1547 nm to approximately 1553 nm. In another implementation, each of surface A and surface B has an AR coating with reflectivity less than 1% at the operating wavelengths of the light source 110. For example, if the housing 155 encloses two sensor heads with respective light sources, the first light source emits pulses at a wavelength of approximately 1535 nm and the second light source emits pulses at a wavelength of approximately 1540 nm, then surface A and surface B may each have an AR coating with reflectivity less than 1% from approximately 1530 nm to approximately 1545 nm.

The window 157 may have an optical transmission that is greater than any suitable value for one or more wavelengths of one or more light sources 110 contained within the housing 155. As an example, the window 157 may have an optical transmission of greater than or equal to 70%, 80%, 90%, 95%, or 99% at a wavelength of light source 110. In one example implementation, the window 157 can transmit greater than or equal to 95% of light at an operating wavelength of the light source 110. In another implementation, the window 157 transmits greater than or equal to 90% of light at the operating wavelengths of the light sources enclosed within the housing 155.

Surface A or surface B may have a dichroic coating that is anti-reflecting at one or more operating wavelengths of one or more light sources 110 and high-reflecting at wavelengths away from the one or more operating wavelengths. For example, surface A may have an AR coating for an operating wavelength of the light source 110, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through the window 117. In one implementation, if light source 110 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90%) at approximately 800-1500 nm and approximately 1580-1700 nm.

Surface B of the window 157 may include a coating that is oleophobic, hydrophobic, or hydrophilic. A coating that is oleophobic (or, lipophobic) may repel oils (e.g., fingerprint oil or other non-polar material) from the exterior surface (surface B) of the window 157. A coating that is hydrophobic may repel water from the exterior surface. For example, surface B may be coated with a material that is both oleophobic and hydrophobic. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 125 than a surface with a non-hydrophilic coating or a hydrophobic coating.

With continued reference to FIG. 1, the light source 110 may include a pulsed laser configured to produce or emit pulses of light with a certain pulse duration. In an example implementation, the pulse duration or pulse width of the pulsed laser is approximately 10 picoseconds (ps) to 20 nanoseconds (ns). In another implementation, the light source 110 is a pulsed laser that produces pulses with a pulse duration of approximately 200-400 ps. In yet another implementation, the light source 110 is a pulsed laser that produces pulses at a pulse repetition frequency of approximately 100 kHz to 5 MHz or a pulse period (e.g., a time between consecutive pulses) of approximately 200 ns to 10 µs. The light source 110 may have a substantially constant or a variable pulse repetition frequency, depending on the implementation. As an example, the light source 110 may be a pulsed laser that produces pulses at a substantially constant pulse repetition frequency of approximately 640 kHz (e.g., 640,000 pulses per second), corresponding to a pulse period of approximately 1.56 µs. As another example, the light source 110 may have a pulse repetition frequency that can be varied from approximately 500 kHz to 3 MHz. As used herein, a pulse of light may be referred to as an optical pulse, a light pulse, or a pulse.

In general, the output beam 125 may have any suitable average optical power, and the output beam 125 may include optical pulses with any suitable pulse energy or peak optical power. Some examples of the average power of the output beam 125 include the approximate values of 1 mW, 10 mW, 100 mW, 1 W, and 10 W. Example values of pulse energy of the output beam 125 include the approximate values of 0.1 µJ, 1 µJ, 10 µJ, 100 µJ, and 1 mJ. Examples of peak power values of pulses included in the output beam 125 are the approximate values of 10 W, 100 W, 1 kW, 5 kW, 10 kW. An example optical pulse with a duration of 400 ps and a pulse energy of 1 µJ has a peak power of approximately 2.5 kW. If the pulse repetition frequency is 500 kHz, then the average power of the output beam 125 with 1-µJ pulses is approximately 0.5 W, in this example.

The light source 110 may include a laser diode, such as a Fabry-Perot laser diode, a quantum well laser, a distributed Bragg reflector (DBR) laser, a distributed feedback (DFB) laser, or a vertical-cavity surface-emitting laser (VCSEL). The laser diode operating in the light source 110 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source 110 includes a pulsed laser diode with a peak emission wavelength of approximately 1400-1600 nm. Further, the light source 110 may include a laser diode that is current-modulated to produce optical pulses.

In some implementation, the light source 110 includes a pulsed laser diode followed by one or more optical-amplification stages. For example, the light source 110 may be a fiber-laser module that includes a current-modulated laser diode with a peak wavelength of approximately 1550 nm, followed by a single-stage or a multi-stage erbium-doped fiber amplifier (EDFA). As another example, the light source 110 may include a continuous-wave (CW) or quasi-CW laser diode followed by an external optical modulator (e.g., an electro-optic modulator), and the output of the modulator may be fed into an optical amplifier. As another example, the light source 110 may include a laser diode followed by a semiconductor optical amplifier (SOA) that amplifies light produced by the laser diode. In yet other implementations, the light source 110 may include a pulsed solid-state laser or a pulsed fiber laser.

In some implementations, the output beam of light 125 emitted by the light source 110 is a collimated optical beam with any suitable beam divergence, such as a divergence of approximately 0.1 to 3.0 milliradian (mrad). Divergence of the output beam 125 may refer to an angular measure of an increase in beam size (e.g., a beam radius or beam diameter) as the output beam 125 travels away from the light source 110 or the lidar system 100. The output beam 125 may have a substantially circular cross section with a beam divergence characterized by a single divergence value. For example, the output beam 125 with a circular cross section and a divergence of 1 mrad may have a beam diameter or spot size of approximately 10 cm at a distance of 100 m from the lidar system 100. In some implementations, the output beam 125 may be an astigmatic beam or may have a substantially elliptical cross section and may be characterized by two divergence values. As an example, the output beam 125 may have a fast axis and a slow axis, where the fast-axis divergence is greater than the slow-axis divergence. As another example, the output beam 125 may be an astigmatic beam with a fast-axis divergence of 2 mrad and a slow-axis divergence of 0.5 mrad.

The output beam of light 125 emitted by light source 110 may be unpolarized or randomly polarized, may have no specific or fixed polarization (e.g., the polarization may vary with time), or may have a particular polarization (e.g., the output beam 125 may be linearly polarized, elliptically polarized, or circularly polarized). As an example, the light source 110 may produce linearly polarized light, and the lidar system 100 may include a quarter-wave plate that converts this linearly polarized light into circularly polarized light. The lidar system 100 may transmit the circularly polarized light as the output beam 125, and receive the input beam 135, which may be substantially or at least partially circularly polarized in the same manner as the output beam 125 (e.g., if the output beam 125 is right-hand circularly polarized, then the input beam 135 may also be right-hand circularly polarized). The input beam 135 may pass through the same quarter-wave plate (or a different quarter-wave plate), resulting in the input beam 135 being converted to linearly polarized light which is orthogonally polarized (e.g., polarized at a right angle) with respect to the linearly polarized light produced by light source 110. As another example, the lidar system 100 may employ polarization-diversity detection where two polarization components are detected separately. The output beam 125 may be linearly polarized, and the lidar system 100 may split the input beam 135 into two polarization components (e.g., s-polarization and p-polarization) which are detected separately by two photodiodes (e.g., a balanced photoreceiver that includes two photodiodes).

With continued reference to FIG. 1, the output beam 125 and input beam 135 may be substantially coaxial. In other words, the output beam 125 and input beam 135 may at least partially overlap or share a common propagation axis, so that the input beam 135 and the output beam 125 travel along substantially the same optical path (albeit in opposite directions). As the lidar system 100 scans the output beam 125 across a field of regard, the input beam 135 may follow along with the output beam 125, so that the coaxial relationship between the two beams is maintained.

The lidar system 100 also may include one or more optical components configured to condition, shape, filter, modify, steer, or direct the output beam 125 and/or the input beam 135. For example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In some implementations, lidar system 100 includes a telescope, one or more lenses, or one or more mirrors to expand, focus, or collimate the output beam 125 to a desired beam diameter or divergence. As an example, the lidar system 100 may include one or more lenses to focus the input beam 135 onto an active region of the receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include the mirror 115, which may be a metallic or dielectric mirror. The mirror 115 may be configured so that the light beam 125 passes through the mirror 115. As an example, mirror 115 may include a hole, slot, or aperture through which the output light beam 125 passes. As another example, the mirror 115 may be configured so that at least 80% of the output beam 125 passes through the mirror 115 and at least 80% of the input beam 135 is reflected by the mirror 115. In some implementations, the mirror 115 may provide for the output beam 125 and the input beam 135 to be substantially coaxial, so that the beams 125 and 135 travel along substantially the same optical path, in opposite directions.

Generally speaking, the scanner 120 steers the output beam 125 in one or more directions downrange. The scanner 120 may include one or more scanning mirrors and one or more actuators driving the mirrors to rotate, tilt, pivot, or move the mirrors in an angular manner about one or more axes, for example. For example, the first mirror of the scanner may scan the output beam 125 along a first direction, and the second mirror may scan the output beam 125 along a second direction that is substantially orthogonal to the first direction. Example implementations of the scanner 120 are discussed in more detail below with reference to FIG. 2.

The scanner 120 may be configured to scan the output beam 125 over a 5-degree angular range, 20-degree angular range, 30-degree angular range, 60-degree angular range, or any other suitable angular range. For example, a scanning mirror may be configured to periodically rotate over a 15-degree range, which results in the output beam 125 scanning across a 30-degree range (e.g., a Θ-degree rotation by a scanning mirror results in a 2Θ-degree angular scan of the output beam 125). A FOR of the lidar system 100 may refer to an area, region, or angular range over which the lidar system 100 may be configured to scan or capture distance information. When the lidar system 100 scans the output beam 125 within a 30-degree scanning range, the lidar system 100 may be referred to as having a 30-degree angular field of regard. As another example, a lidar system 100 with a scanning mirror that rotates over a 30-degree range may produce the output beam 125 that scans across a 60-degree range (e.g., a 60-degree FOR). In various implementations, the lidar system 100 may have a FOR of approximately 10°, 20°, 40°, 60°, 120°, or any other suitable FOR. The FOR also may be referred to as a scan region.

The scanner 120 may be configured to scan the output beam 125 horizontally and vertically, and the lidar system 100 may have a particular FOR along the horizontal direction and another particular FOR along the vertical direction. For example, the lidar system 100 may have a horizontal FOR of 10° to 120° and a vertical FOR of 2° to 45°.

The one or more scanning mirrors of the scanner 120 may be communicatively coupled to the controller 150 which may control the scanning mirror(s) so as to guide the output beam 125 in a desired direction downrange or along a desired scan pattern. In general, a scan pattern may refer to a pattern or path along which the output beam 125 is directed, and also may be referred to as an optical scan pattern, optical scan path, or scan path. As an example, the scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. The lidar system 100 can use the scan path to generate a point cloud with pixels that substantially cover the 60°×20° FOR. The pixels may be approximately evenly distributed across the 60°×20° FOR. Alternately, the pixels may have a particular non-uniform distribution (e.g., the pixels may be distributed across all or a portion of the 60°×20° FOR, and the pixels may have a higher density in one or more particular regions of the 60°×20° FOR).

In operation, the light source 110 may emit pulses of light which the scanner 120 scans across a FOR of lidar system 100. The target 130 may scatter one or more of the emitted pulses, and the receiver 140 may detect at least a portion of the pulses of light scattered by the target 130.

The receiver 140 may be referred to as (or may include) a photoreceiver, optical receiver, optical sensor, detector, photodetector, or optical detector. The receiver 140 in some implementations receives or detects at least a portion of the input beam 135 and produces an electrical signal that corresponds to the input beam 135. For example, if the input beam 135 includes an optical pulse, then the receiver 140 may produce an electrical current or voltage pulse that corresponds to the optical pulse detected by the receiver 140. In an example implementation, the receiver 140 includes one or more avalanche photodiodes (APDs) or one or more single-photon avalanche diodes (SPADs). In another implementation, the receiver 140 includes one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions).

In embodiments, an optical filter may be located in front of the receiver 140 and configured to transmit light at one or more operating wavelengths of the light source 110 and attenuate light at surrounding wavelengths. For example, an optical filter may be a free-space spectral filter located at the surface B, surface A, or anywhere in an optical path before the receiver 140. This optical filter may transmit light at the operating wavelength of the light source 110 (e.g., between approximately 1530 nm and 1560 nm) and attenuate light outside that wavelength range. As a more specific example, light with wavelengths of approximately 400-1530 nm or 1560-2000 nm may be attenuated by any suitable amount, such as for example, by at least 5 dB, 10 dB, 20 dB, 30 dB, or 40 dB.

The receiver 140 may have an active region or an avalanche-multiplication region that includes silicon, germanium, or InGaAs. The active region of receiver 140 may have any suitable size, such as for example, a diameter or width of approximately 50-500 μm. The receiver 140 may include circuitry that performs signal amplification, sampling, filtering, signal conditioning, analog-to-digital conversion, time-to-digital conversion, pulse detection, threshold detection, rising-edge detection, or falling-edge detection. For example, the receiver 140 may include a transimpedance amplifier that converts a received photocurrent (e.g., a current produced by an APD in response to a received optical signal) into a voltage signal. The receiver 140 may direct the voltage signal to pulse-detection circuitry that produces an analog or digital output signal 145 that corresponds to one or more characteristics (e.g., rising edge, falling edge, amplitude, or duration) of a received optical pulse. For example, the pulse-detection circuitry may perform a time-to-digital conversion to produce a digital output signal 145. The receiver 140 may send the electrical output signal 145 to the controller 150 for processing or analysis, e.g., to determine a time-of-flight value corresponding to a received optical pulse.

The controller 150 may be electrically coupled or otherwise communicatively coupled to one or more of the light source 110, the scanner 120, and the receiver 140. The controller 150 may receive electrical trigger pulses or edges from the light source 110, where each pulse or edge corresponds to the emission of an optical pulse by the light source 110. The controller 150 may provide instructions, a control signal, or a trigger signal to the light source 110 indicating when the light source 110 should produce optical pulses. For example, the controller 150 may send an electrical trigger signal that includes electrical pulses, where the light source 110 emits an optical pulse in response to each electrical pulse. Further, the controller 150 may cause the light source 110 to adjust one or more of the frequency, period, duration, pulse energy, peak power, average power, or wavelength of optical pulses emitted by the light source 110.

The controller 150 may determine a time-of-flight value for an optical pulse based on timing information associated with when the pulse was emitted by light source 110 and when a portion of the pulse (e.g., the input beam 135) was detected or received by the receiver 140. The controller 150 may include circuitry that performs signal amplification, sampling, filtering, signal conditioning, analog-to-digital conversion, time-to-digital conversion, pulse detection, threshold detection, rising-edge detection, or falling-edge detection.

As indicated above, the lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel. A collection of pixels captured in succession (which may be referred to as a depth map, a point cloud, or a frame) may be rendered as an image or may be analyzed to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

The lidar system 100 may be configured to repeatedly capture or generate point clouds of a field of regard at any suitable frame rate between approximately 0.1 frames per second (FPS) and approximately 1,000 FPS. For example, the lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. In an example implementation, the lidar system 100 is configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). The point-cloud frame rate may be substantially fixed or dynamically adjustable, depending on the implementation. For example, the lidar system 100 may capture one or more point clouds at a particular frame rate (e.g., 1 Hz) and then switch to capture one or more point clouds at a different frame rate (e.g., 10 Hz). In general, the lidar system can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 100 can overlap, encompass, or enclose at least a portion of the target 130, which may include all or part of an object that is moving or stationary relative to lidar system 100. For example, the target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Figure 2:
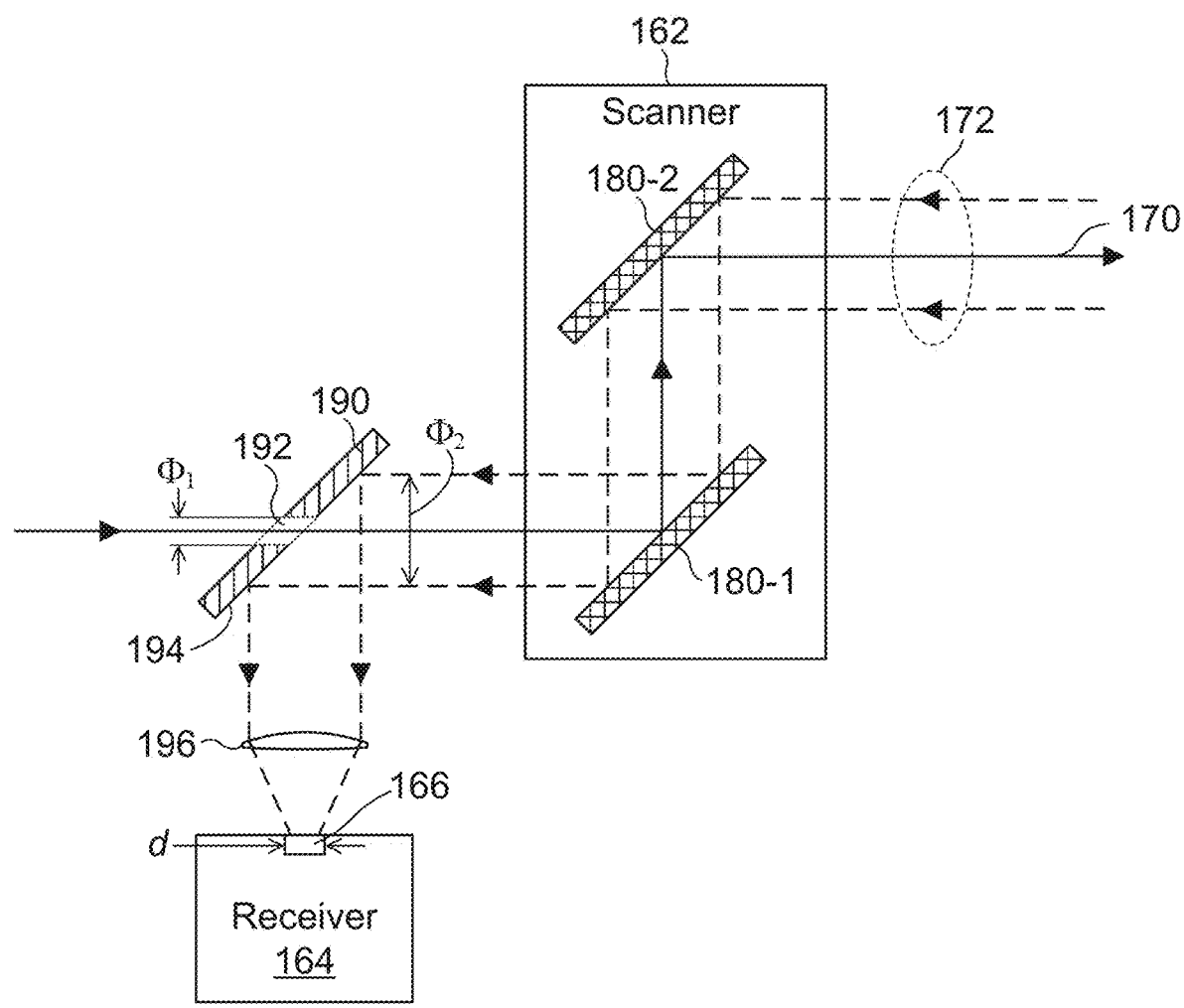
FIG. 2 illustrates in more detail several components that can operate in the system of FIG. 1.

Now referring to FIG. 2, a scanner 162 and a receiver 164 can operate in the lidar system of FIG. 1 as the scanner 120 and the receiver 140, respectively. More generally, the scanner 162 and the receiver 164 can operate in any suitable lidar system.

The scanner 162 may include any suitable number of mirrors driven by any suitable number of mechanical actuators. For example, the scanner 162 may include a galvanometer scanner, a resonant scanner, a piezoelectric actuator, a polygon-mirror scanner, a rotating-prism scanner, a voice coil motor, a DC motor, a stepper motor, or a microelectromechanical systems (MEMS) device, or any other suitable actuator or mechanism.

A galvanometer scanner (which also may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate. A polygon-mirror scanner may include a multi-sided mirror (e.g., a four-sided or six-sided mirror) that is rotated in one direction to scan an output beam 170 across a FOR.

In an example implementation, the scanner 162 includes a single mirror configured to scan an output beam 170 along a single direction (e.g., the scanner 162 may be a one-dimensional scanner that scans along a horizontal or vertical direction). The mirror may be a flat scanning mirror attached to a scanner actuator or mechanism which scans the mirror over a particular angular range. The mirror may be driven by one actuator (e.g., a galvanometer) or two actuators configured to drive the mirror in a push-pull configuration. When two actuators drive the mirror in one direction in a push-pull configuration, the actuators may be located at opposite ends or sides of the mirror. The may operate in a cooperative manner so that when one actuator pushes on the mirror, the other actuator pulls on the mirror, and vice versa. In another example implementation, two voice coil actuators arranged in a push-pull configuration drive a mirror along a horizontal or vertical direction.

In some implementations, the scanner 162 may include one mirror configured to be scanned along two axes, where two actuators arranged in a push-pull configuration provide motion along each axis. For example, two resonant actuators arranged in a horizontal push-pull configuration may drive the mirror along a horizontal direction, and another pair of resonant actuators arranged in a vertical push-pull configuration may drive mirror along a vertical direction. In another example implementation, two actuators scan the output beam 170 along two directions (e.g., horizontal and vertical), where each actuator provides rotational motion along a particular direction or about a particular axis.

The scanner 162 also may include one mirror driven by two actuators configured to scan the mirror along two substantially orthogonal directions. For example, a resonant actuator or a galvanometer actuator may drive one mirror along a substantially horizontal direction, and a galvanometer actuator may drive the mirror along a substantially vertical direction. As another example, two resonant actuators may drive a mirror along two substantially orthogonal directions.

In some implementations, the scanner 162 includes two mirrors, where one mirror scans the output beam 170 along a substantially horizontal direction and the other mirror scans the output beam 170 along a substantially vertical direction. In the example of FIG. 2, the scanner 162 includes two mirrors, a mirror 180-1 and a mirror 180-2. The mirror 180-1 may scan the output beam 170 along a substantially horizontal direction, and the mirror 180-2 may scan the output beam 170 along a substantially vertical direction (or vice versa).

The scanner 162 in other implementations includes two galvanometer scanners driving respective mirrors. For example, the scanner 162 may include a galvanometer actuator that scans the mirror 180-1 along a first direction (e.g., vertical), and the scanner 162 may include another galvanometer actuator that scans the mirror 180-2 along a second direction (e.g., horizontal). In yet another implementation, the scanner 162 includes two mirrors, where a galvanometer actuator drives one mirror, and a resonant actuator drives the other mirror. For example, a galvanometer actuator may scan the mirror 180-1 along a first direction, and a resonant actuator may scan the mirror 180-2 along a second direction. The first and second scanning directions may be substantially orthogonal to one another, e.g., the first direction may be substantially vertical, and the second direction may be substantially horizontal. In yet another implementation, the scanner 162 may include two mirrors, where a galvanometer scans one mirror along a first direction, and the other mirror is a polygon mirror that is scanned along a second direction.

To direct the output beam 170 along a particular scan pattern, the scanner 162 may include two or more actuators driving a single mirror synchronously. For example, the two or more actuators can drive the mirror synchronously along two substantially orthogonal directions to make the output beam 170 follow a scan pattern with substantially straight lines. In some implementations, the scanner 162 may include two mirrors and actuators driving the two mirrors synchronously to generate a scan pattern that includes substantially straight lines. For example, a galvanometer actuator may drive the mirror 180-2 with a substantially linear back-and-forth motion (e.g., the galvanometer may be driven with a substantially sinusoidal or triangle-shaped waveform) that causes the output beam 170 to trace a substantially horizontal back-and-forth pattern, and another galvanometer actuator may scan the mirror 180-1 along a substantially vertical direction. The two galvanometers may be synchronized so that for every 64 horizontal traces, the output beam 170 makes a single trace along a vertical direction. Whether one or two mirrors are used, the substantially straight lines can be directed substantially horizontally, vertically, or along any other suitable direction.

The scanner 162 also may apply a dynamically adjusted deflection along a vertical direction (e.g., with a galvanometer actuator) as the output beam 170 is scanned along a substantially horizontal direction (e.g., with a galvanometer or resonant actuator) to achieve the straight lines. If a vertical deflection is not applied, the output beam 170 may trace out a curved path as it scans from side to side. In some implementations, the scanner 162 uses a vertical actuator to apply a dynamically adjusted vertical deflection as the output beam 170 is scanned horizontally as well as a discrete vertical offset between each horizontal scan (e.g., to step the output beam 170 to a subsequent row of a scan pattern).

With continued reference to FIG. 2, an overlap mirror 190 in this example implementation is configured to overlap the input beam 172 and output beam 170, so that the beams 170 and 172 are substantially coaxial. In FIG. 2, the overlap mirror 190 includes a hole, slot, or aperture 192 through which the output beam 170 passes, and a reflecting surface 194 that reflects at least a portion of the input beam 172 toward the receiver 164. The overlap mirror 190 may be oriented so that input beam 172 and output beam 170 are at least partially overlapped.

The input beam 172 may pass through a lens 196 which focuses the beam onto an active region 166 of the receiver 164. The active region 166 may refer to an area over which receiver 164 may receive or detect input light. The active region may have any suitable size or diameter d, such as for example, a diameter of approximately 25 μm, 50 μm, 80 μm, 100 μm, 200 μm, 500 μm, 1 mm, 2 mm, or 5 mm. The overlap mirror 190 may have a reflecting surface 194 that is substantially flat or the reflecting surface 194 may be curved (e.g., the mirror 190 may be an off-axis parabolic mirror configured to focus the input beam 172 onto an active region of the receiver 140).

The aperture 192 may have any suitable size or diameter $\Phi_1$, and the input beam 172 may have any suitable size or diameter $\Phi_2$, where $\Phi_2$ is greater than $\Phi_1$. For example, the aperture 192 may have a diameter $\Phi_1$ of approximately 0.2 mm, 0.5 mm, 1 mm, 2 mm, 3 mm, 5 mm, or 10 mm, and the input beam 172 may have a diameter $\Phi_2$ of approximately 2 mm, 5 mm, 10 mm, 15 mm, 20 mm, 30 mm, 40 mm, or 50 mm. In some implementations, the reflective surface 194 of the overlap mirror 190 may reflect 70% or more of input beam 172 toward the receiver 164. For example, if the reflective surface 194 has a reflectivity R at an operating wavelength of the light source 160, then the fraction of input beam 172 directed toward the receiver 164 may be expressed as $R \times [1-(\Phi_1/\Phi_2)^2]$. As a more specific example, if R is 95%, $t_1$ is 2 mm, and $\Phi_2$ is 10 mm, then approximately 91% of the input beam 172 may be directed toward the receiver 164 by the reflective surface 194.

Generating Pixels within a Field of Regard

Figure 3:
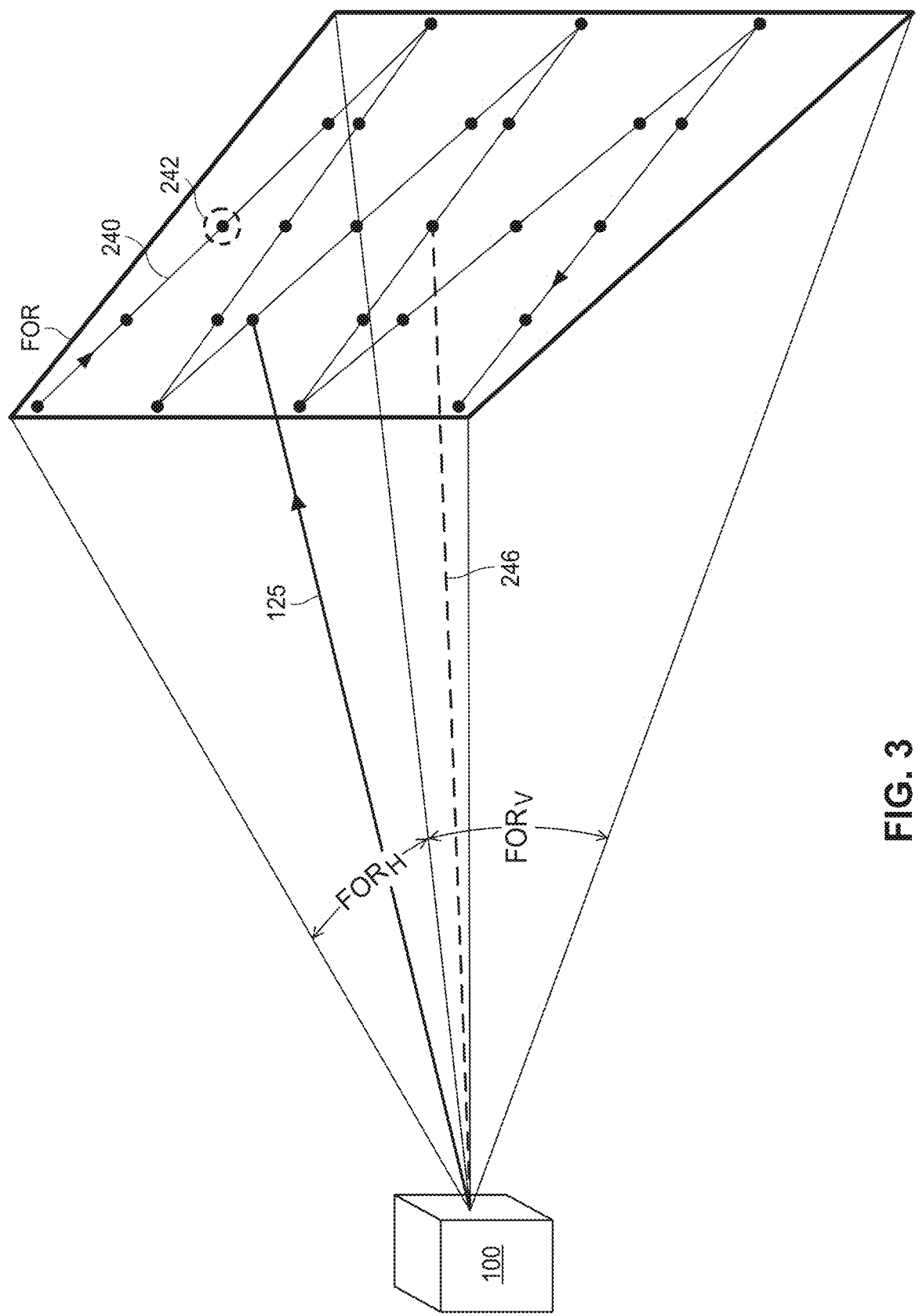
FIG. 3 illustrates an example scan pattern which the lidar system of FIG. 1 can produce when identifying targets within a field of regard.

FIG. 3 illustrates an example scan pattern 240 which the lidar system 100 of FIG. 1 can produce. The lidar system 100 may be configured to scan output optical beam 125 along one or more scan patterns 240. In some implementations, the scan pattern 240 corresponds to a scan across any suitable field of regard (FOR) having any suitable horizontal FOR (FOR$_H$) and any suitable vertical FOR (FOR$_V$). For example, a certain scan pattern may have a field of regard represented by angular dimensions (e.g., FOR$_H$×FOR$_V$) 40°×30°, 90°×40°, or 60°×15°. As another example, a certain scan pattern may have a FOR$_H$ greater than or equal to 10°, 25°, 30°, 40°, 60°, 90°, or 120°. As yet another example, a certain scan pattern may have a FOR$_V$ greater than or equal to 2°, 5°, 10°, 15°, 20°, 30°, or 45°. In the example of FIG. 3, reference line 246 represents a center of the field of regard of scan pattern 240. The reference line 246 may have any suitable orientation, such as, a horizontal angle of 0° (e.g., reference line 246 may be oriented straight ahead) and a vertical angle of 0° (e.g., reference line 246 may have an inclination of 0°), or the reference line 246 may have a nonzero horizontal angle or a nonzero inclination (e.g., a vertical angle of +10° or −10°). In FIG. 3, if the scan pattern 240 has a 60°×15° field of regard, then the scan pattern 240 covers a ±30° horizontal range with respect to reference line 246 and a ±7.5° vertical range with respect to reference line 246. Additionally, the optical beam 125 in FIG. 3 has an orientation of approximately −15° horizontal and +3° vertical with respect to reference line 246. The beam 125 may be referred to as having an azimuth of −15° and an altitude of +3° relative to the reference line 246. An azimuth (which may be referred to as an azimuth angle) may represent a horizontal angle with respect to the reference line 246, and an altitude (which may be referred to as an altitude angle, elevation, or elevation angle) may represent a vertical angle with respect to the reference line 246.

The scan pattern 240 may include multiple pixels 242, and each pixel 242 may be associated with one or more laser pulses and one or more corresponding distance measurements. A cycle of scan pattern 240 may include a total of $P_x \times P_y$ pixels 242 (e.g., a two-dimensional distribution of $P_x$ by $P_y$ pixels). For example, the scan pattern 240 may include a distribution with dimensions of approximately 100-2,000 pixels 242 along a horizontal direction and approximately 4-400 pixels 242 along a vertical direction. As another example, the scan pattern 240 may include a distribution of 1,000 pixels 242 along the horizontal direction by 64 pixels 242 along the vertical direction (e.g., the frame size is 1000×64 pixels) for a total of 64,000 pixels per cycle of scan pattern 240. The number of pixels 242 along a horizontal direction may be referred to as a horizontal resolution of the scan pattern 240, and the number of pixels 242 along a vertical direction may be referred to as a vertical resolution of the scan pattern 240. As an example, the scan pattern 240 may have a horizontal resolution of greater than or equal to 100 pixels 242 and a vertical resolution of greater than or equal to 4 pixels 242. As another example, the scan pattern 240 may have a horizontal resolution of 100-2,000 pixels 242 and a vertical resolution of 4-400 pixels 242. Additionally, certain sub-regions within a FOR may have different resolutions depending on desired resolutions of object and target detection. In examples discussed herein, the resolution may be defined as the number of pixels per FOR, the number of pixels per line of a FOR (e.g., the four pixels 242 across each line of the scan 240 of FIG. 3, with the new line being defined at the borders of the FOR), or another suitable definition of pixel resolution. For example, a sub-region of the FOR of FIG. 3 may have a horizontal and/or vertical resolution of between 4 and 10 pixels per line of the scan pattern 240 to detect trees and off road targets. Whereas, sub-regions of the FOR that are determined to contain roads may have higher horizontal and/or vertical resolutions of hundreds to thousands of pixels per line of the scan pattern 240, to better detect and track the locations and movements of other vehicles, pedestrians, traffic lines, or other targets and objects on a road.

Each pixel 242 may be associated with a distance (e.g., a distance to a portion of a target 130 from which the corresponding laser pulse was scattered) and/or one or more angular values. As an example, the pixel 242 may be associated with a distance value and two angular values (e.g., an azimuth and altitude) that represent the angular location of the pixel 242 with respect to the lidar system 100. A distance to a portion of the target 130 may be determined based at least in part on a time-of-flight measurement for a corresponding pulse. An angular value (e.g., an azimuth or altitude) may correspond to an angle (e.g., relative to reference line 246) of the output beam 125 (e.g., when a corresponding pulse is emitted from lidar system 100) or an angle of the input beam 135 (e.g., when an input signal is received by lidar system 100). In some implementations, the lidar system 100 determines an angular value based at least in part on a position of a component of the scanner 120. For example, an azimuth or altitude value associated with the pixel 242 may be determined from an angular position of one or more corresponding scanning mirrors of the scanner 120.

In some implementations, the lidar system 100 concurrently directs multiple beams across the field of regard. In the example implementation of FIG. 4, the lidar system generates output beams 250A, 250B, 250C, ... 250N etc., each of which follows a linear scan pattern 254A, 254B, 254C, ... 254N. The number of parallel lines can be 2, 4, 12, 20, or any other suitable number. The lidar system 100 may angularly separate the beams 250A, 250B, 250C, ... 250N, so that, for example, the separation between beams 250A and 250B at a certain distance may be 30 cm, and the separation between the same beams 250A and 250B at a longer distance may be 50 cm.

Similar to the scan pattern 240, each of the linear scan patterns 254A-N includes pixels associated with one or more laser pulses and distance measurements. FIG. 4 illustrates example pixels 252A, 252B and 252C along the scan patterns 254A, 254B and 254C, respectively. The lidar system 100 in this example may generate the values for the pixels 252A-252N at the same time, thus increasing the scan rate.

Depending on the implementation, the lidar system 100 may output the beams 250A-N at the same wavelength or different wavelengths. The beam 250A for example may have the wavelength of 1470 nm, the beam 250B may have the wavelength of 1500 nm, the beam 250C may have the wavelength of 1550 nm, etc. The number of different wavelengths the lidar system 100 uses need not match the number of channels. Thus, the lidar system 100 in the example implementation of FIG. 4 may use M wavelengths with N channels, where $1 \leq M \leq N$.

Next, FIG. 5 illustrates an example light-source field of view ($FOV_L$) and receiver field of view ($FOV_R$) for the lidar system 100. The light source 110 may emit pulses of light as the $FOV_L$ and $FOV_R$ are scanned by the scanner 120 across a field of regard (FOR). The light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. For example, as the scanner 120 scans the light-source field of view across a field of regard, the lidar system 100 may send the pulse of light in the direction the $FOV_L$ is pointing at the time the light source 110 emits the pulse is emitted. The pulse of light may scatter off the target 130, and the receiver 140 may receive and detect a portion of the scattered light that is directed along or contained within the $FOV_R$.

In some implementations, the scanner 120 is configured to scan both a light-source field of view and a receiver field of view across a field of regard of the lidar system 100. The lidar system 100 may emit and detect multiple pulses of light as the scanner 120 scans the $FOV_L$ and $FOV_R$ across the field of regard while tracing out the scan pattern 240. The scanner 120 in some implementations scans the light-source field of view and the receiver field of view synchronously with respect to one another. In this case, as the scanner 120 scans $FOV_L$ across a scan pattern 240, the $FOV_R$ follows substantially the same path at the same scanning speed. Additionally, the $FOV_L$ and $FOV_R$ may maintain the same relative position to one another as the scanner 120 scans $FOV_L$ and $FOV_R$ across the field of regard. For example, the $FOV_L$ may be substantially overlapped with or centered inside the $FOV_R$ (as illustrated in FIG. 4), and the scanner 120 may maintain this relative positioning between $FOV_L$ and $FOV_R$ throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

The $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. The receiver field of view may be any suitable size relative to the light-source field of view. For example, the receiver field of view may be smaller than, substantially the same size as, or larger than the angular extent of the light-source field of view. In some implementations, the light-source field of view has an angular extent of less than or equal to 50 milliradians, and the receiver field of view has an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. The light-source field of view and the receiver field of view may have approximately equal angular extents. As an example, $\Theta_L$ and $\Theta_R$ may both be approximately equal to 1 mrad, 2 mrad, or 3 mrad. In some implementations, the receiver field of view is larger than the light-source field of view, or the light-source field of view is larger than the receiver field of view. For example, $\Theta_L$ may be approximately equal to 1.5 mrad, and $\Theta_R$ may be approximately equal to 3 mrad.

A pixel 242 may represent or correspond to a light-source field of view. As the output beam 125 propagates from the light source 110, the diameter of the output beam 125 (as well as the size of the corresponding pixel 242) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 242 may also have a corresponding size or diameter of approximately 20 cm. At a distance of 200 m from the lidar system 100, the output beam 125 and the corresponding pixel 242 may each have a diameter of approximately 40 cm.

A Lidar System Operating in a Vehicle

As indicated above, one or more lidar systems 100 may be integrated into a vehicle. In one example implementation, multiple lidar systems 100 may be integrated into a car to provide a complete 360-degree horizontal FOR around the car. As another example, 4-10 lidar systems 100, each system having a 45-degree to 120-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-45 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In some implementations, one or more lidar systems 100 are included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. The lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar systems 100 are integrated into a vehicle as part of an autonomous-vehicle driving system. In an example implementation, the lidar system 100 provides information about the surrounding environment to a driving system of an autonomous vehicle. An autonomous-vehicle driving system may include one or more computing systems that receive information from the lidar system 100 about the surrounding environment, analyze the received information, and provide control signals to the vehicle's driving systems (e.g., steering wheel, accelerator, brake, or turn signal). For example, the lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if the lidar system 100 detects a vehicle ahead that is slowing down or stopping, the autonomous-vehicle driving system may send instructions to release the accelerator and apply the brakes.

An autonomous vehicle may be referred to as an autonomous car, driverless car, self-driving car, robotic car, or unmanned vehicle. An autonomous vehicle may be a vehicle configured to sense its environment and navigate or drive with little or no human input. For example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

An autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In some implementations, a light source of a lidar system is located remotely from some of the other components of the lidar system such as the scanner and the receiver. Moreover, a lidar system implemented in a vehicle may include fewer light sources than scanners and receivers.

FIGS. 6A and 6B illustrates an example autonomous vehicle 300 in which a controller 304 can operate various components 302 for maneuvering and otherwise control operation of the vehicle 300. These components are depicted in an expanded view in FIG. 6A for clarity. The components 302 can include an accelerator 310, brakes 312, a vehicle engine 314, a steering mechanism 316, lights 318 such as brake lights, head lights, reverse lights, emergency lights, etc., a gear selector 320, and/or other suitable components that effectuate and control movement of the vehicle 300. The gear selector 320 may include the park, reverse, neutral, drive gears, etc. Each of the components 302 may include an interface via which the component receives commands from the vehicle controller 304 such as "increase speed," "decrease speed," "turn left 5 degrees," "activate left turn signal," etc. and, in some cases, provides feedback to the vehicle controller 304.

The autonomous vehicle 300 can be equipped with a lidar system including multiple sensor heads 308A-E coupled to the controller via sensor links 306. Each of the sensor heads 308 may include a light source and a receiver, for example, and each of the sensor links 306 may include one or more optical links and/or one or more electrical links. The sensor heads 308 in FIG. 6A are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 308 may be attached to, or incorporated into, a bumper, fender, grill, side panel, spoiler, roof, headlight assembly, taillight assembly, rear-view mirror assembly, hood, trunk, window, or any other suitable part of the vehicle.

In the example of FIG. 6A, five sensor heads 308 are positioned on the vehicle (e.g., each of the sensor heads 308 may be incorporated into a light assembly, side panel, bumper, or fender) at positions providing different fields of regard for the sensor heads 308, and the laser may be located within the vehicle 300 (e.g., in or near the trunk). As illustrated in FIG. 6B, the five sensor heads 308 may each provide a 120° horizontal field of regard (FOR), and the five sensor heads 308 may be oriented so that together they provide a complete 360-degree view around the vehicle. As another example, the lidar system 302 may include six sensor heads 308 positioned on or around the vehicle 300, where each of the sensor heads 308 provides a 60° to 90° horizontal FOR. As another example, the lidar system may include eight sensor heads 308, and each of the sensor heads

308 may provide a 45° to 60° horizontal FOR. As yet another example, the lidar system may include six sensor heads 308, where each of the sensor heads 308 provides a 70° horizontal FOR with an overlap between adjacent sensor heads 308 of approximately 10°. As another example, the lidar system may include two sensor heads 308 which together provide a forward-facing horizontal FOR of greater than or equal to 30°.

In the embodiment illustrated in FIG. 6B, the sensor heads 308 each have a FOR of 120° which provides overlap between the FORs of the sensor head 308. For example, the sensor heads 308A and 308B have a FOR overlap of approximate 60° due to the position and relative angular configuration of the sensor heads 308A and 308B. Similarly, the overlaps of the FORs for sensor heads 308B and 308c, and for sensor heads 208A and 308E have approximately 60° of overlap. Due to the uneven spatial distribution and arrangement of the FORs of the sensor heads 308, the overlap of the FORs for sensor heads 308C and 308D, and sensor heads 308D and 308E have a smaller overlap of approximately 30°. In embodiments, the overlap of the FORs of the sensors may be configured to be any desired overlap dependent on the number of sensor heads 308, and the spatial and angular arrangement of the sensor heads.

Data from each of the sensor heads 308 may be combined or stitched together to generate a point cloud that covers a less than or equal to 360-degree horizontal view around a vehicle. For example, the lidar system may include a controller or processor that receives data from each of the sensor heads 308 (e.g., via a corresponding electrical link 306) and processes the received data to construct a point cloud covering a 360-degree horizontal view around a vehicle or to determine distances to one or more targets. The point cloud or information from the point cloud may be provided to a vehicle controller 304 via a corresponding electrical, optical, or radio link 306. The vehicle controller 304 may include one or more CPUs, GPUs, and a non-transitory memory with persistent components (e.g., flash memory, an optical disk) and/or non-persistent components (e.g., RAM).

In some implementations, the point cloud is generated by combining data from each of the multiple sensor heads 308 at a controller included within the lidar system, and is provided to the vehicle controller 304. In other implementations, each of the sensor heads 308 includes a controller or processor that constructs a point cloud for a portion of the 360-degree horizontal view around the vehicle and provides the respective point cloud to the vehicle controller 304. The vehicle controller 304 then combines or stitches together the points clouds from the respective sensor heads 308 to construct a combined point cloud covering a 360-degree horizontal view. Still further, the vehicle controller 304 in some implementations communicates with a remote server to process point cloud data.

In some implementations, the vehicle controller 304 receives point cloud data from the sensor heads 308 via the links 306 and analyzes the received point cloud data, using any one or more of the aggregate or individual SDCAs disclosed herein, to sense or identify targets and their respective locations, distances, speeds, shapes, sizes, type of target (e.g., vehicle, human, tree, animal), etc. The vehicle controller 304 then provides control signals via the links 306 to the components 302 to control operation of the vehicle based on the analyzed information.

In addition to the lidar system, the vehicle 300 may also be equipped with an inertial measurement unit (IMU) 330 and other sensors 332 such a camera, a thermal imager, a conventional radar (none illustrated to avoid clutter), etc. The other sensors 332 may each have respective FORs that may be stitched together to generate 360-degree horizontal views around the vehicle. In embodiments, the data from the other sensors 332 may be combined with the data from the sensor heads 308 to generate data sets to enable autonomous operation of the vehicle 300. The sensors 330 and 332 can provide additional data to the vehicle controller 304 via wired or wireless communication links. Further, the vehicle 300 in an example implementation includes a microphone array operating as a part of an acoustic source localization system configured to determine sources of sounds.

As illustrated in FIG. 6A, the vehicle controller 304 can include a perception module 352 and a motion planner 354, each of which can be implemented using hardware, firmware, software, or any suitable combination of hardware, firmware, and software. In operation, the perception module 352 can receive sensor data from the sensors 330, 332, 308A-E, etc. and apply the received sensor data to a perception model 353 to generate parameters of the environment in which the autonomous vehicle 300 operates, such as curvature of the road, presence of obstacles, distance to obstacles, etc. The perception module 352 then can supply these generated parameters to the motion planner 354, which in turn generates decisions for controlling the autonomous vehicle 300 and provides corresponding commands to the accelerator 310, the brakes 312, the vehicle engine 314, the steering mechanism 316, etc.

The motion planner 354 may utilize any suitable type(s) of rules, algorithms, heuristic models, machine learning models, or other suitable techniques to make driving decisions based on the output of the perception module 352, which utilizes the perception model 353 as discussed above. For example, in some implementations, the motion planner 354 is configured with corresponding algorithms to make particular decisions for controlling the autonomous vehicle 300 in response to specific signals or combination of signals. As another example, in some embodiments, a machine learning model for the motion planner 354 may be trained using descriptions of environmental parameters of the type the perception model 353 generates. In additional embodiments, virtual data to train a machine learning model of motion planner 534. For example, the motion planner 534 may be a "learning based" planner (e.g., a planner that is trained using supervised learning or reinforcement learning), a "search based" planner (e.g., a continuous A* planner), a "sampling based" planner (e.g., a planner that performs random searches in a space that represents a universe of possible decisions), a "predictive control based" planner (e.g., a model predictive control (MPC) planner), and so on. In any case, a training platform can train the motion planning model separately and independently of the perception module 352.

Pulse Detection Details and Circuitry
Optimizing Transformation Parameters for Combining Data from Multiple Lidar Sensors FIG. 7 illustrates the overlap region 308A-B of the sensor heads 308A and 308B of FIGS. 6A and 6B. Both of the sensor heads 308A and 308B detect a target 360 in the respective FORs of the sensor heads 308A and 308B. To stitch together the data from the FORs of the sensor heads 308A and 308B, transformations must be performed on at least one of the data sets from the sensor 308A or 308B. Additionally, sensor head 308A may detect certain features of the target 360 that are unobservable by sensor head 308B due to the difference of the FORs of sensor head 308A and 308B. For example, sensor head 308A may detect an entirety of a vehicle and determine that the vehicle is a semi-truck, while sensor head 308B may only detect the back-end of the vehicle and not have enough data to determine whether the vehicle is a semi-truck or a much smaller moving van. It is therefore important for proper alignment of data, and data transformations to be determined and performed for improving the detection abilities, target identifications, target location determinations, and other features required for autonomous operation of a vehicle.

Figure 8:
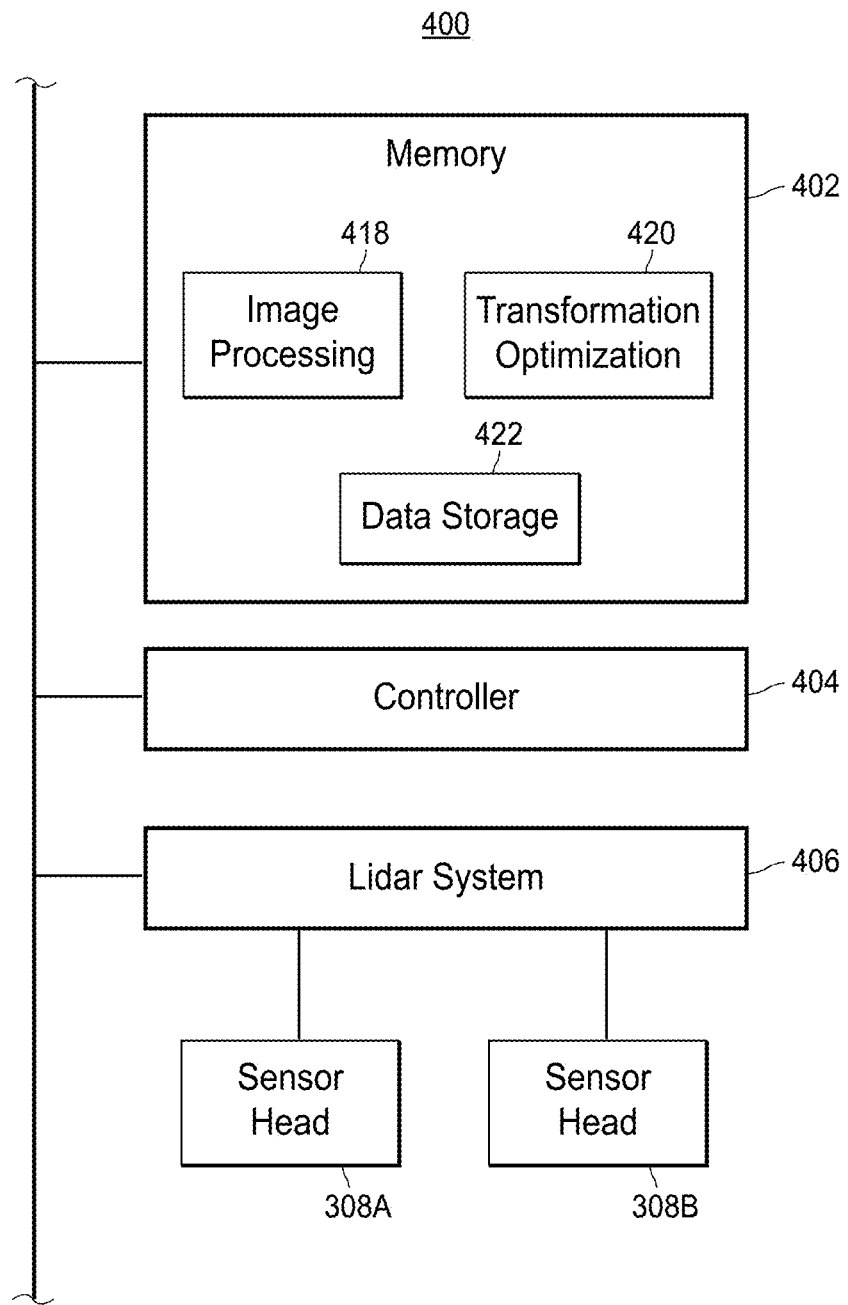
FIG. 8 illustrates an example system in which a lidar system with multiple lidar sensor heads is used to obtain information about an environment.

FIG. 8 illustrates an example system 400 in which a multi-sensor head lidar system 406 is used to obtain information about the environment. The system 400 may operate in a vehicle and collect information about the area in front of the vehicle. Additionally or alternatively, the system 400 may collect information about the area behind the vehicle, to the right of the vehicle, to the left of the vehicle, etc. The lidar system 406 may be similar to the lidar system 100 of FIG. 1, for example, and may contain multiple sensor heads such as the sensor heads 308A and 308B of FIGS. 6A, 6B, and 7. The multiple sensor heads 308A and 308B having an overlapping FOR region 308A-B, illustrated in FIG. 7. In an example implementation, the sensor heads 308A and 308B maintain the same orientation relative to the vehicle so that, for example, the field of regard of the sensor heads 308A and 308B corresponds to the 120-degree horizontal fields of regard illustrated in FIGS. 6A, 6B and 7.

The system 400 in this example is equipped with a computer-readable memory 602, with persistent and non-persistent components, and a controller 404 including one or more processing units (such as CPUs and/or GPUs) configured to access the computer-readable memory 402. The computer readable memory may store imaging software 418 configured to obtain image data from one or more sensors, such as the lidar sensor heads 308A and 308B, and to perform image processing techniques on the image data. Further, the computer-readable memory 402 may store transformation optimization software 420 configured to perform data transforms on data sets obtained from the lidar system 406, and specifically, to determine optimized transformation parameters for combining, merging, or registering, data sets from the multiple sensor heads 308A and 308B of the lidar system 406. The computer-readable memory 402 also may store the original and transformed lidar pixel data in data storage 422. As used herein, combining sensor data may be referred to as merging or registering sensor data. For example, a first set of sensor data and a second set of sensor data (obtained from two respective sensors) may be combined by transforming the second set of sensor data into the perspective of the first set of sensor data using a set of transformation parameters. Transforming the second set of data may be referred to as registering the second set of data with respect to the first set of data.

In operation, the lidar system 406 may obtain pixels using the techniques discussed above, for example, in accordance with a scan pattern corresponding to one channel (see FIG. 3) or several channels (see FIG. 4). The pixels obtained by the lidar system 406 may be referred to below as "lidar pixels" for clarity. Generally speaking, the lidar system 406 collects M pixels of a scan frame, i.e., as the lidar system 406 traverses the entire scan pattern. In an example implementation, M is 50,000 for each of the sensor heads 308A and 308B. In other examples, the sensor heads 308A and 308B may have different scan pattern resolutions, for example sensor head 308A may collect 40,000 pixels during a single scan pattern, and sensor head 308B may collect 60,000 pixels during a single scan pattern which may depend on a priority of the FOR and potential detected targets within the FOR of each respective sensor head.

Figure 9:
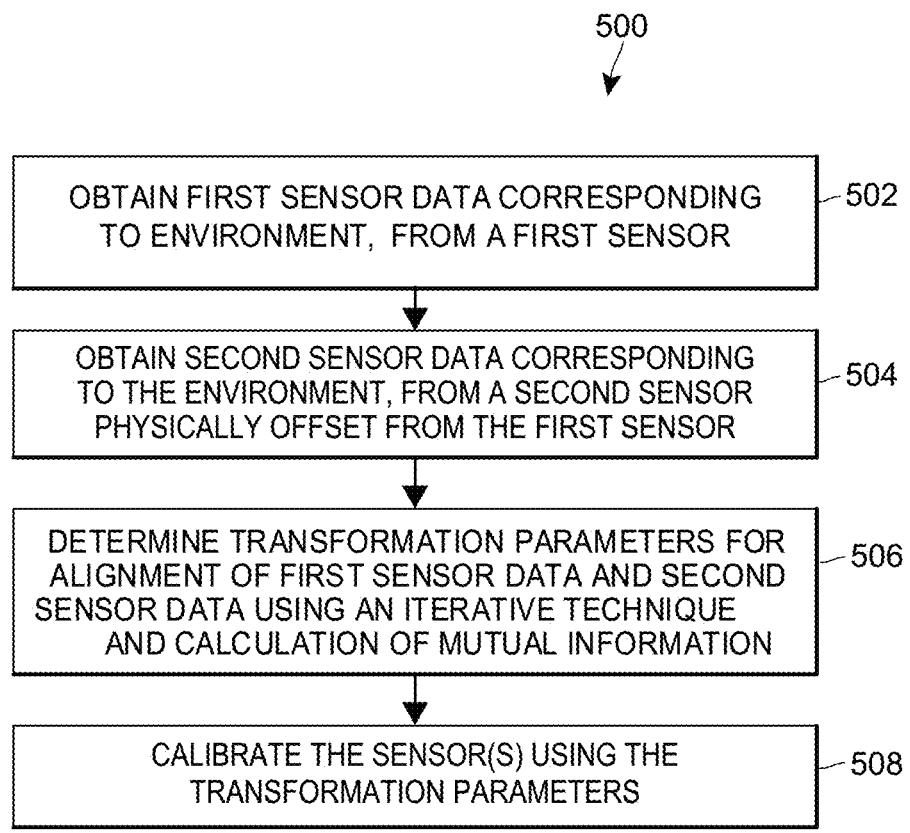
FIG. 9 is a flow diagram of a method for determining optimal transformation parameters for a two sensor system.

The transformation optimization software 420, or another suitable software, firmware, or hardware module, may implement a method 500, illustrated in FIG. 9, to more accurately align lidar pixel data from one of the sensor heads (e.g., sensor head 308A), with lidar data from a different sensor head with a different FOR (e.g., sensor head 308B). For convenience, the method 500 is discussed below with reference to the transformation optimization software 420 and other components of FIG. 8. Additionally, the transformation optimization software 420 may determine optimized transformation parameters for use in adjusting or calibrating sensors of the multi-sensor lidar system 406.

At block 502, the image processing software 418 obtains first sensor data corresponding to the environment from a first sensor of the environment. For example, the image processing software 418 may obtain a set of lidar pixels from the sensor head 308A of the lidar system 406. Specifically, the image processing software 418 may obtain lidar pixels $LP1_1, LP1_2, LP1_3, \ldots$ at times $t1_1, t1_2, t1_3$, etc. In another implementation, image processing software 418 obtains multiple pixels from the sensor head 308A at each of the times $t1_1, t1_2, t1_3$, etc.

At block 504, the image processing software 418 obtains second sensor data corresponding to the environment from a second sensor of the environment. For example, the image processing software 418 may obtain a set of lidar pixels from the sensor head 308B of the lidar system 406. Specifically, the image processing software 418 may obtain lidar pixels $LP2_1, LP2_2, LP2_3, \ldots$ at times $t2_1, t2_2, t2_3$, etc. In another implementation, image processing software 418 obtains multiple pixels from the sensor head 308B at each of the times $t2_1, t2_2, t2_3$, etc.

The lidar pixels of the sets of data obtained from the sensor head 308A and the sensor head 308B have an overlap of the field of regard, at least partially. The blocks 502 and 504 may be executed separately or concurrently. For example, the controller 404 may receive data from the sensor head 308A and the second sensor head 308B of the lidar system 608 in parallel with a certain interleave, for example.

At block 506, the transformation optimization software 420 determines transformation parameters for aligning the data from the first sensor (e.g., the sensor head 308A) with the data from the second sensor (e.g., the sensor head 308B). Additionally, the transformation optimization software 420 performs an iterative technique that determines the mutual information of the data set from the first sensor with the data set of the second sensor to identify optimized transformation parameters for combining the data from the first sensor with the second sensor.

At block 508, the sensor head 308A or the sensor head 308B may be calibrated using the determined optimized transformation parameters. For example, it may be determined that a manual or automatic realignment of either the sensor head 308A and/or sensor head 308B should be performed based on the determined optimized transformation parameters or a change in the determined optimized transformation parameters from a desired or previously determined set of optimized transformation parameters. Additionally, the determined optimized set of transformation parameters may be used by the controller 404, vehicle controller 304 of FIG. 6A, and various components 302 of FIG. 6A for autonomous operation of the vehicle 300.

Figure 10:
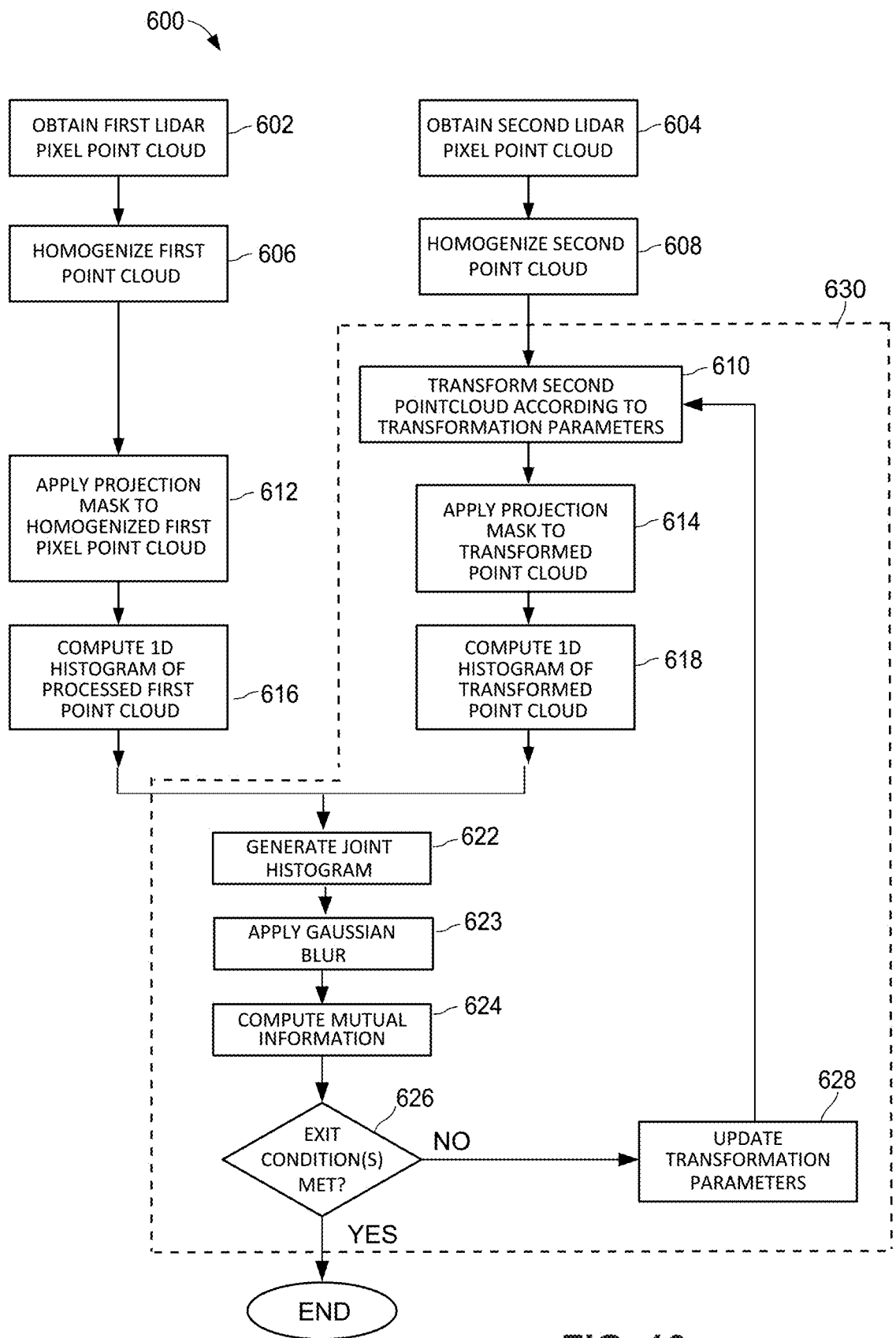
FIG. 10 is a flow diagram of a method for determining optimal transformation parameters for combining data from different lidar sensors.

FIG. 10 is a flow diagram of a method 600 for determining optimal transformation parameters for combining data from different lidar sensors according to the embodiments described herein. The method 600 of FIG. 10 describes some of the steps illustrated in FIG. 9 in more detail, and specifically, some of the processes for optimizing the transformation parameters. At blocks 602 and 604, a first lidar pixel point cloud and a second lidar pixel point cloud are obtained from respective lidar systems, or lidar sensor heads. The first and second lidar pixel point clouds having some overlap of spatial data due to overlap of the fields of regard of the respective lidar systems, or lidar sensor heads. At block 606 the first lidar pixel point cloud is homogenized, by applying a homogeneous transformation matrix, and a data set is generated containing three-dimensional spatial coordinates and an intensity value for each of the pixels in the first lidar pixel point cloud. The resultant data set is a four dimensional data set, [X, Y, Z, I], with 'X', 'Y', and 'Z' being the three dimensional spatial coordinates for the lidar pixels, and 'I' being a respective, received optical intensity value of the first lidar system. At block 608, the second lidar pixel data is homogenized, by applying a homogeneous transformation matrix, and, similarly, a four dimensional data set, [X, Y, Z, I], is generated for the second lidar pixel point cloud, with 'X', 'Y', and 'Z' being spatial coordinates of the lidar pixels and 'I' being a respective received intensity value for each of the pixels by the second lidar system.

The method 600 enters an optimization loop 630 that iteratively performs transformations on the homogenized second lidar pixel point cloud, using candidate transformation parameters, to determine optimal transformation parameters for combining data received from the first and second lidar sensors, and for calibrating the lidar sensors. At block 610 a candidate transformation matrix is used to transform the second homogenized pixel data set into a transformed point cloud. The candidate transformation matrix, 'T' may have extrinsic transformation parameters such as a set of extrinsic rotation parameters 'R', and a set of extrinsic translation parameters 't' such that T=[R|t]. The rotation parameters 'R' may be expressed as Euler angles, or as quaternions. For example, the transformation matrix may be based on a rotation quaternion that provides a rotational transformation and/or a translation vector that provides translation. Expressing the rotation parameters using quaternions may reduce complications due to gimbal lock and loss of a degree of freedom in three-dimensional space. The mapping transformation of a pixel from the homogenized second lidar pixel point cloud, to a pixel in the homogenized first lidar pixel point cloud may be performed by $$p_i = K[R|t]P_i,$$

with $p_i$ being the $i^{th}$ point in the homogenized first lidar pixel point cloud, K being a first sensor projection matrix, R being the extrinsic rotation parameters, t being the extrinsic translation parameters, and $P_i$ being the $i^{th}$ point in the homogenized second lidar pixel point cloud.

The initial transformation parameters applied to the pixel data set during the first iteration of the optimization loop 630 may be determined by user input values, based on a set of previously determined optimized transformation values, or may be determined by a processor or system configured to find an approximate field of regard overlap of the first and second sets of pixel point clouds.

After the transformed point cloud has been generated, at blocks 612 and 614, projection masks are applied to the homogenized first lidar pixel point cloud, and the transformed point cloud to generate a masked first point cloud and a masked transformed point cloud.

At blocks 616 and 618, the one-dimensional histograms of the masked first point cloud and masked transformed point cloud are determined. The one-dimensional histograms may be used to determine various parameters, such as for example, smoothing parameters for smoothing histogram data.

At block 622, a joint histogram is generated and at block 623 a Gaussian blur is applied to the joint histogram formed from the first and second sets of data. In embodiments, a different smoothing filter, other than a Gaussian blur, may be applied to the joint histogram to reduce potential noise in the joint histogram for further processing. The joint histogram may be determined from the first and second sets of data, for a region of overlap between the FOR of the first sensor and the FOR of the second sensor. The joint histogram may include a two-dimensional grid of values, where each axis of the grid corresponds to intensity or depth data from one of the sensors (e.g., for camera data, the axes may correspond to intensity, and for lidar data, the axes may correspond to intensity and/or depth). Additionally, each value of the grid represents a probability (or a number of times) that a corresponding sample pair of data from the two sensors occurs or is observed in the region of overlap. For example, the grid values may include counts of the number of times a particular sample pair of data occurs, and a count value may be converted to a joint probability value (e.g., $p_{XY}(x,y)$) by dividing the count value by the total number of count values in the grid. At block 624, the mutual information of the two sets of data is determined from the joint histogram. The mutual information of two data sets is a measure of approximately how much data the two data sets share, and therefore, the mutual information of the joint histogram of the processed first and second sets of liar pixel point clouds, is one measure that may be used to determine the amount of spatial overlap of the first and second lidar pixel point clouds. Further, the mutual information may be used to determine optimized parameters for point cloud transformations as described herein. For example, transformations that result in higher mutual information values indicate better spatial overlapping of the first lidar pixel point cloud and the transformed pixel point cloud, which is required for combining data from multiple sensors for enabling autonomous vehicle operation, or for calibration of sensors, as described herein.

The mutual information of the two sets of data may be calculated by determining the entropies of the two sets of data independently, $$H(X) = -\Sigma_{x \in X} p_X \log p_X(x)$$

$$H(Y) = -\Sigma_{y \in Y} p_Y \log p_Y(y)$$

determining the joint entropy of the two sets of data from the joint histogram, $$H(X,Y) = -\Sigma_{x \in X} \Sigma_{y \in Y} p_X p_Y \log p_{XY}(x,y)$$

and performing the summation $$MI(X,Y) = H(X) + H(Y) - H(X,Y),$$

where 'X' is the data from the histogram of the first processed lidar pixel point cloud, and 'Y' is the data from the histogram of the processed transformed point cloud from the second lidar pixel point cloud, 'H' is the entropy for a given data set, and 'MI' is the mutual information value.

This process for determining the mutual information may be referred to as applying a probabilistic technique to the values of the joint histogram, and the probabilistic technique may include or may be referred to as a maximum likelihood estimation (MLE). The mutual information value can range from a value of 0, which indicates that the data sets 'X' and 'Y' are completely independent data sets, to values much greater than 1, which, as the value increases, indicates that the data sets share more information (i.e., the pixels in the first point cloud and transformed point cloud represent information from the same points in three-dimensional space). In embodiments, the mutual information may be a normalized value to set a maximum value for the mutual information. In some embodiments, the mutual information value may be weighted with a first weight applied to the sets of spatial coordinates of the pixels (i.e., X, Y, and Z) and a second weight applied to the pixel intensity values (i.e., the values I). For example, the spatial coordinates and the intensity values can be given equal weights so that both types of data have equal influence on the transformation parameters. As another example, the intensity values can be given a lower weight (e.g., one-half the weight of the spatial coordinates) so that the intensity values have less influence on the transformation parameters. Applying a reduced weight to intensity values may help in the anomalous cases, such as for example, when there is a specular reflection into one sensor but the other sensor only receives scattered light (which may produce different intensity values for the same object). In any embodiments, the measurement of mutual information is a useful metric for determining optimized transformation parameters for combining point cloud data from multiple lidar sensors, and for calibrating sensors in a multi-sensor system.

The method 600 may further determine a mutual information cost. The mutual information cost being the negative of the mutual information value, a weighted mutual information value, or a scaled mutual information value. Additionally, the difference between a current mutual information value, or cost, and a mutual information value, or cost, from a previous iteration of the optimization technique of method 600 may be calculated. For the first iteration the mutual information difference may not be calculated due to a lack of any previously determined mutual information value for calculating a mutual information difference. Alternatively, an initial mutual information difference may be a predefined value and the mutual information difference for the first iteration may be determined using the initial mutual information value, and a current mutual information value determined by the first iteration of the optimization loop 630.

At block 626, the method 600 determines if one or more exit conditions have been met. If the one or more exit conditions have been met, the method ends and the optimized transformation parameters are stored in a memory, communicated to a processor or controller, or communicated to an external device or system via wireless communication, hardwired communication, or other network or communication interface. If at block 626, it is determined that the one or more exit conditions have not been met, then the candidate extrinsic transformation parameters (i.e., the rotational and translation transformation parameters) are updated, at block 628, and the homogenized second lidar pixel point cloud is transformed by the updated candidate transformation parameters at block 610. The method repeats the optimization loop 630 iteratively updating the transformation parameters and determining mutual information values until the one or more exit conditions have been met, at block 626.

In embodiments, the one or more exit conditions may include achieving a certain mutual information value (e.g., a mutual information value of 1, 10, 20, 50, 100, etc.), achieving a minimum mutual information cost threshold (e.g., a cost threshold of less than 1, less than −1, less than −10, less than −20 etc.), achieving a difference between a mutual information value of a current iteration and a mutual information value of a previous iteration (e.g., a difference threshold of less than 5, less than 1, less than 0.5, less than 0.1, less than 0.05, less than 0.01, etc.), achieving a difference between a cost value of a current iteration and a cost value of a previous iteration (e.g., a difference threshold of less than 5, less than 1, less than 0.5, less than 0.1, less than 0.05, less than 0.01, etc.), performing a number of iterations of the optimization loop 630 (e.g., 10 iterations, 100 iterations, 1000 iterations, etc.), or another exit condition. Additionally, in embodiments, the extrinsic parameters may be updated by perturbing the extrinsic transformation parameters of the current iteration by a determined value. For example, the current parameters may be shifted or scaled (i.e., added to or multiplied by) by a randomly generated value from a weighted Gaussian distribution, Poissonian distribution, exponential distribution, or by another probability distribution or probability density function. In examples, the transformation parameters may be perturbed by a percentage of the current transformation parameter value, for example the transformation parameter may be perturbed by 1%, 5%, 8%, 10%, or 15% or the current transformation parameter value. Additionally, the updated extrinsic parameters may be determined by a gradient-descent algorithm (e.g., the Barzilai-Borwein method) or a gradient-free method (e.g., the Nedler-Mead optimization).

In embodiments, the type of perturbation and amount or percentage of perturbation may be determined by the current mutual information value, mutual information cost, a difference of the cost value of a current iteration and the cost value of a previous iteration, or a difference of the mutual information value of a current iteration and the mutual information value of a previous iteration. For example, it may be desirable to perturb the transformation parameters by 15% when the difference of the mutual information value between two consecutive iterations is greater than 10. In subsequent iterations, it may be determined that the perturbation should be reduced to 5% due to a decrease in the difference of the mutual information value between two iterations of the optimization process. Dynamically changing the perturbation during optimization may decrease optimization times, enable greater mutual information values of the determined optimized transformation parameters, and allow for smaller difference in mutual information values between iterations during optimizations.

Figure 11A:
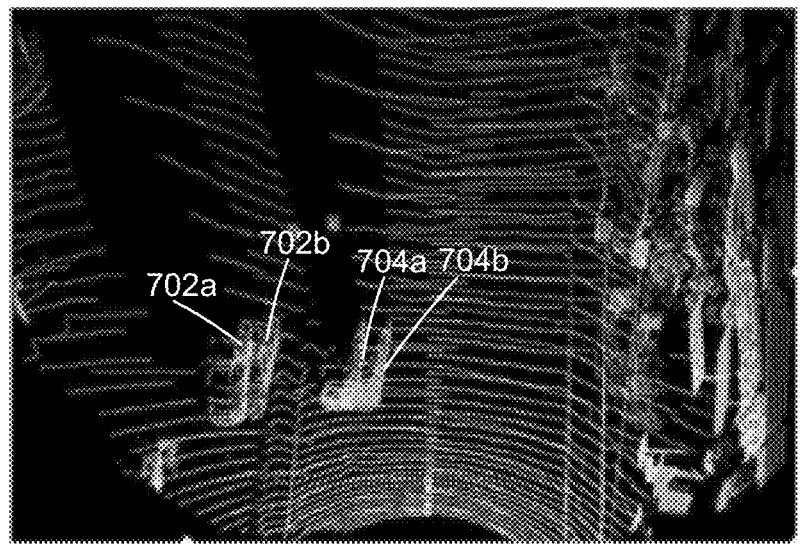
FIG. 11A is a lidar image of two lidar point clouds received from two independent lidar sensors having a spatial offset of respective fields of regard.
Figure 11B:
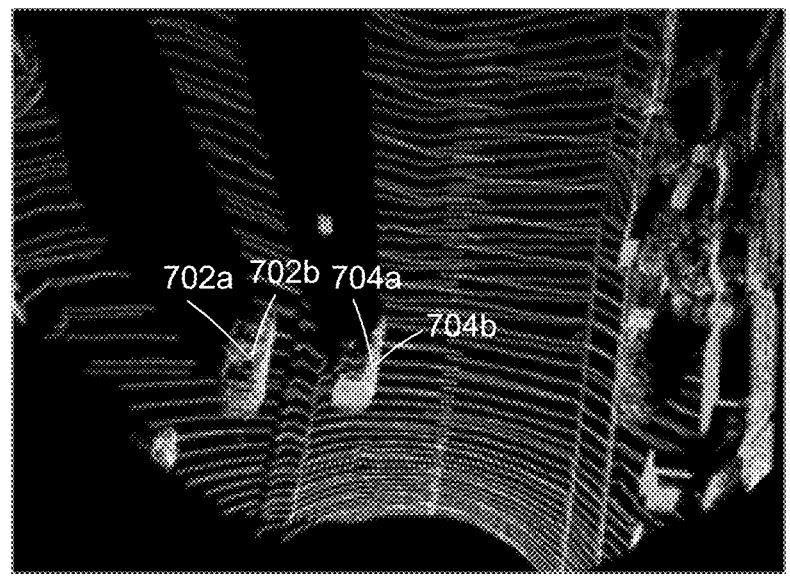
FIG. 11B is a lidar image of two lidar point clouds received from two independent lidar sensors having a spatial offset of the fields of regard, after performing a transformation optimization.

FIGS. 11A and 11B are images representative of two lidar point clouds received from two independent lidar sensors having a spatial offset of the fields of regard of the two lidar sensors. FIG. 11A presents a lidar point cloud of the first sensor as dotted lines, and the lidar point cloud of the second sensor as dashed lines. While illustrated by dotted and dashed lines, the two lidar point clouds of FIG. 11A should be understood to be indicative of a set of pixels from lidar point clouds, and not to be the presented dotted and dashed lines shown in FIG. 11A. FIG. 11A shows that the two sensors detect similar regions of three-dimensional space. Specifically, the corresponding features 702a and 702b, and 704a and 704b show that second lidar sensor has a field of regard that detects the features 702b and 704b slightly to the right, and angled slightly clockwise, compared to the detection of the features 702a and 704b by the first lidar sensor.

FIG. 11B illustrates the two lidar point clouds presented in FIG. 11A after a transformation optimization process, such as the method 500 of FIG. 9, or the method 600 of FIG. 10, has been performed for the two lidar point clouds. Comparing the point clouds, and features 702a 702b, 704a, and 704b, of FIGS. 11A and 11B, it is apparent that there is more overlap the first lidar point cloud (dotted lines) and the second lidar point cloud (dashed lines) after the transformation optimization has been performed (i.e., greater mutual information between the point clouds). The two point clouds illustrated in FIG. 11B may then be combined for use in autonomous driving applications or any application that requires spatial detection of features and targets in a three-dimensional space. Additionally, by tracking a health score associated with subsequent point clouds over time, it may be determined that one of the first or second sensor requires a realignment, or physical adjustment. For example, a car having first and second lidar sensors disposed on the front left headlight, and front right headlight, respectively, may collide into the bumper of another car. Depending on the force and location of the collision, the collision may cause the second sensor to physically shift, changing its field of regard either angularly and/or translationally. The transformation optimization may then be performed and it may be determined that the second sensor has shifted out of an acceptable field of regard and that the second sensor needs to be physically adjusted either manually (e.g., by a mechanic, technician, owner of a vehicle, or other agent) or automatically (e.g., by actuators and motors controlled by a controller).

Optimizing Transformation Parameters for Combining Lidar and Camera Data

Figure 12:
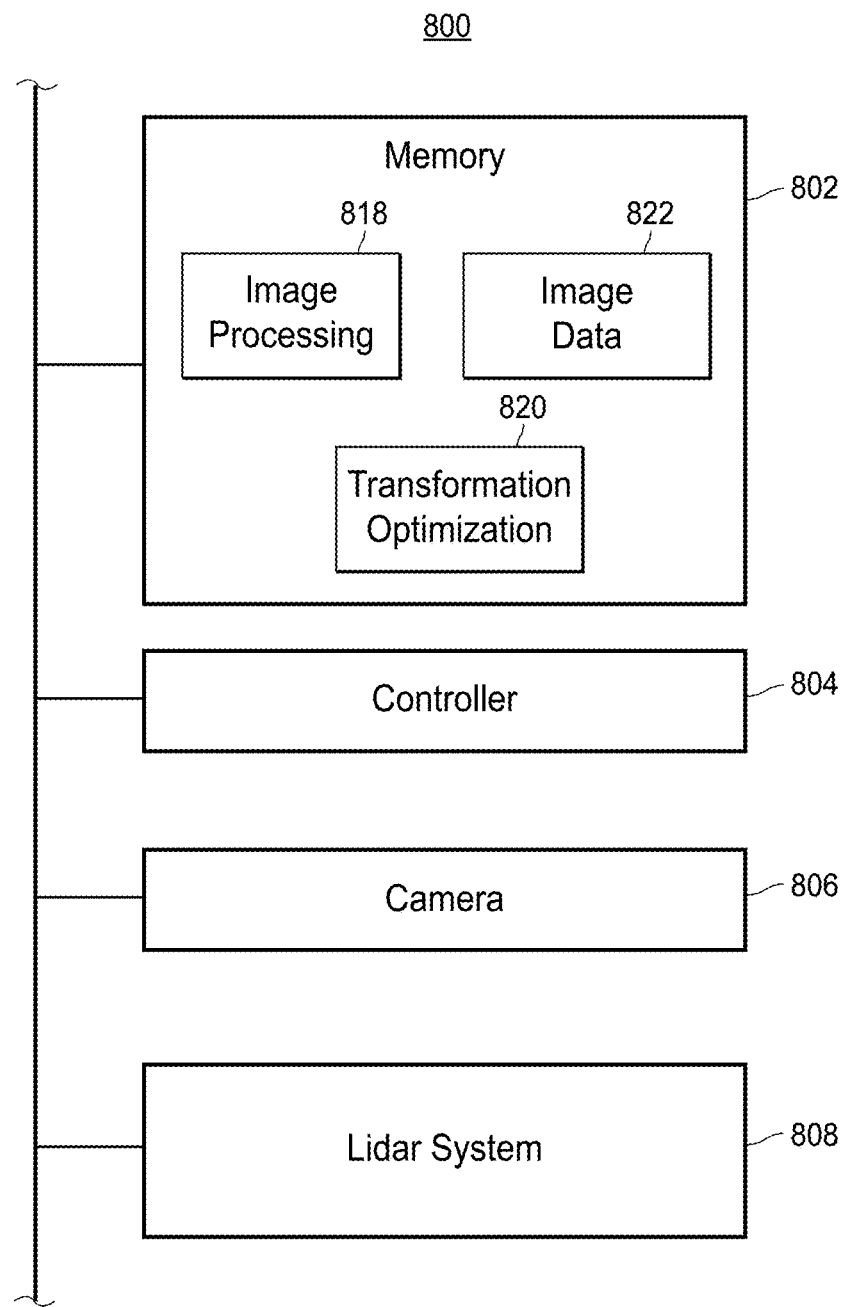
FIG. 12 illustrates an example system in which a camera cooperates with a lidar system to obtain information about an environment.

FIG. 12 illustrates an example system 800 in which a camera 806 cooperates with a lidar system 808 to obtain information about the environment. The system 800 may operate in a vehicle and collect information about the area in front of the vehicle. Additionally or alternatively, the system 800 may collect information about the area behind the vehicle, to the right of the vehicle, to the left of the vehicle, etc. The lidar system 808 may be similar to the lidar system 100 of FIG. 1, for example. The camera 806 can be any suitable camera that captures passive light signals within a field of view. For example, the camera 806 can capture a 768 by 1024 array of pixels at a time by detecting ambient light reflected by various targets within the field of view. Unlike a lidar system, which obtains only a relatively small set of pixels at any one time by emitting light pulses and detecting reflections of these emitted light pulses, the camera 806 can capture a large number of pixels at the same time. In an example implementation, the camera 806 maintains the same orientation relative to the vehicle so that, for example, the field of view of the camera 806 corresponds to the 120 by 60 degree field of view ahead of the vehicle.

The system 800 in this example is equipped with a computer-readable memory 802, with persistent and non-persistent components, and a controller 802 including one or more processing units (such as CPUs and/or GPUs) configured to access the computer-readable memory 802. The computer-readable memory 802 may store image processing software 818 configured to detect and identify objects of various types using suitable image processing techniques. The image processing software 818 may include instructions in one or several programming languages, but in general, the functionality of the image processing software 818 may be implemented using software, firmware, hardware, or any suitable combination thereof. The computer-readable memory 802 may store transformation optimization software 820 configured to perform data transforms on data sets obtained from the lidar system 808 and the camera 806. The transformation optimization software 820 may be a same or similar software as the software 420 of FIG. 8 for combining data sets from multiple lidar sensor heads. The computer-readable memory 802 also may store the image data 822, which may include a sequence of photographs as well as lidar point cloud pixel data.

Figure 13:
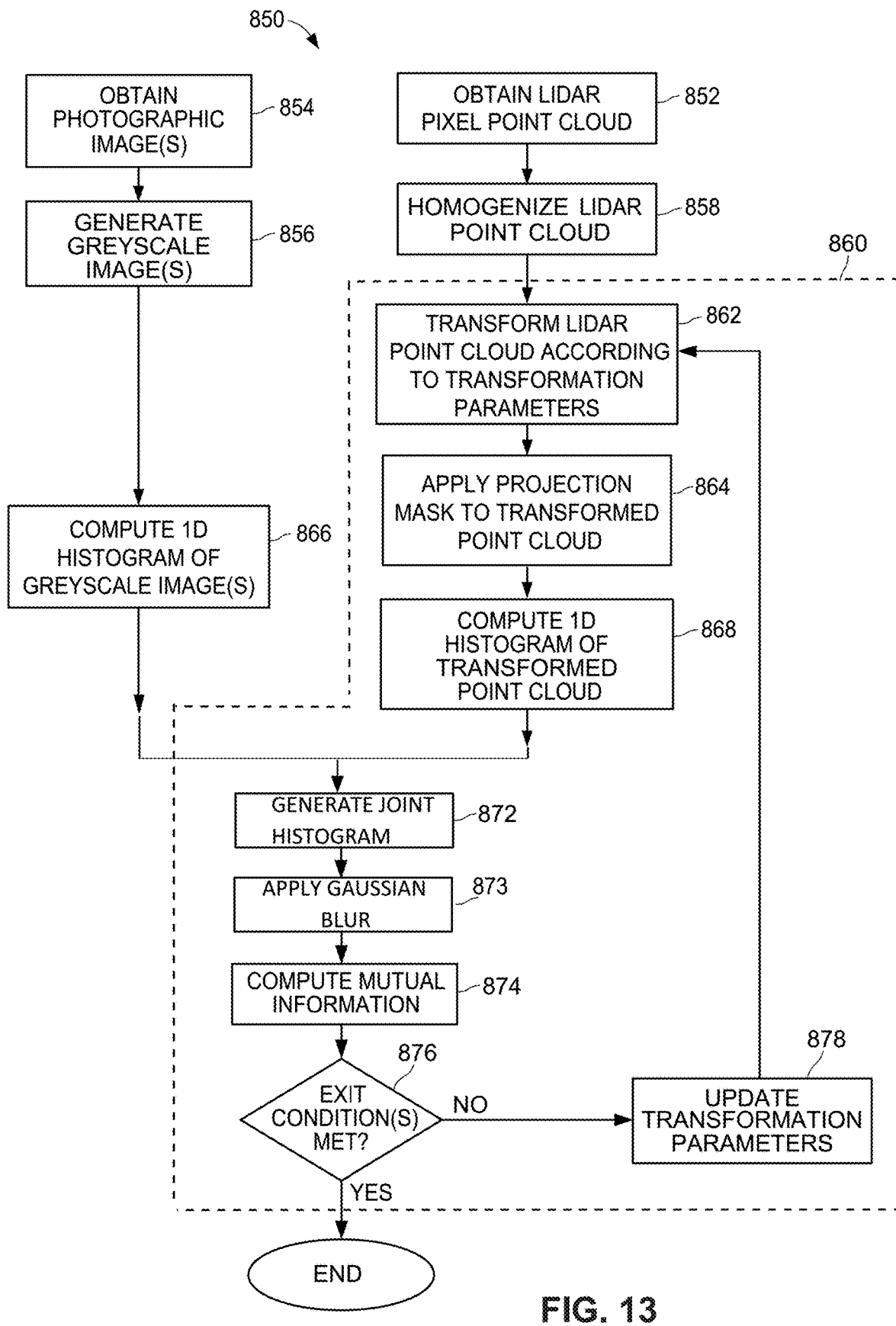
FIG. 13 is a flow diagram of a method for optimizing transformation parameters for combining lidar and camera data.

FIG. 13 is a flow diagram of a method 850 for optimizing transformation parameters for combining lidar and camera data. Referring now simultaneously to FIGS. 12 and 13, at block 852, the lidar system 808 may obtain pixel data indicative of a field of regard of the lidar system 808. In operation, the lidar system 808 may obtain the pixels using the techniques discussed above, for example, in accordance with a scan pattern corresponding to one channel (see FIG. 3) or several channels (see FIG. 4). The pixels obtained by the lidar system 808 may be referred to below as "lidar pixels" for clarity. In embodiments, the lidar pixels may be obtained in a sequence corresponding to the scan pattern implemented by the lidar module 808. For example, the lidar system may obtain lidar pixels $LP_1$, $LP_2$, $LP_3$, ... at times $t_1$, $t_2$, $t_3$, etc. In another implementation, the lidar system may obtain multiple pixels at each of the times $t_1$, $t_2$, $t_3$, etc.

At block 854 the camera 806 may obtain photographic images at a certain rate concurrently with the lidar system 808 obtaining lidar pixels. Generally speaking, the camera 806 may collect N images while the lidar system 808 collects all the M pixels of a scan frame, i.e., traverses the entire scan pattern. In an example implementation, M is 50,000 and N is approximately 100. Thus, during the time interval during which the lidar system 808 collects 50,000 lidar pixels, the camera 806 collects 100 photographic images. The photographic images overlap the field of the regard of the lidar system 808 at least partially. The blocks 852 and 854 may be executed separately or concurrently. For example, the controller 804 may receive data from the camera 806 and the lidar system 808 in parallel with a certain interleave, for example.

In examples, the image processing software 818 aligns the lidar pixels with the pixels of the photographs in view of the timing of the scan, due to the difference of obtaining the lidar data and the image data. Of course, the resolution of the camera 806 need not match the resolution of the lidar system 808. Thus, the photographic images, in general, may include fewer, the same number, or more pixels than the lidar point cloud. Thus, one lidar pixel may be aligned with a cluster (e.g., three by three) of pixels of the photographic image or, conversely, a cluster of lidar pixels may be aligned with a single pixel of the photographic image or images.

As one example, the image processing software 818 may align a lidar pixel with one or several pixels of a photographic image, and/or align the pixel with one or several pixels of the photographic image. In an example implementation, for a certain lidar pixel in, the image processing software 818 may identify the photographic image in the sequence of N images that is most proximate in time to the lidar pixel. Thus, for example, the image processing software 818 may align the lidar pixel obtained near the middle of a scan pattern with a photographic image captured approximately in the middle of the sequence of N images. Accordingly, the image processing software 818 may generate a combined, time-aligned data set. For example, the image processing software 818 may generate and store in the memory 602 an array corresponding to the higher one of the two resolutions (of the camera 806 and the lidar system 808), with each element storing both a lidar pixel and a camera pixel.

In an example scenario, the image processing software 818 determines, with a certain degree of certainty, that an object captured in the photographic image is an animal and further directs the lidar system 808 to temporarily focus the scan in this region of interest, so as to raise the level of certainty regarding the identification or to measure the distance to the animal, for example. More generally, the image processing software 818 may modify one or more of the scan pattern, the pulse rate, the power of the emitted pulses, the gains at the receiver, etc. in view of the identified object. In another example scenario, the image processing software 818 determines that the object is probably a human and causes the lidar system 808 to lower the power of emitted pulses for safety. Further, the image processing software 818 in some cases may not identify the object but nevertheless determine that the object is within the field of regard of the lidar system 808 and adjust the scan pattern based on detecting an object of an unknown type.

At block 856, the image processing software 818 generates greyscale images from the photographic images. In embodiments, the greyscale image processing may be performed by the photographic cameras or sensors, the photographic cameras or sensors may capture the images as greyscale images, or the greyscale image processing may be performed by a processor executing the image processing software 818.

At block 858, the image processing software 818 homogenizes the lidar pixel point cloud into a data set containing three-dimensional spatial coordinates and an intensity value for each of the pixels in the lidar pixel point cloud. The resultant data set is a four dimensional data set, [X, Y, Z, I], with 'X', 'Y', and 'Z' being the three dimensional spatial coordinates for the lidar pixels, and 'I' being a respective, received optical intensity value of the lidar system.

The method 800 enters an optimization loop 860 that iteratively performs transformations, using candidate transformation parameters, to determine optimal transformation parameters for combining data from the lidar and photographic cameras, and for calibrating the lidar and photographic image sensors. At block 862 the lidar data is transformed according to the candidate transformation matrix T=[R|t], as described above in reference to FIG. 10. At block 864, a projection mask is applied to the transformed point cloud.

At blocks 866 and 868, the one-dimensional and two-dimensional histograms are determined for the greyscale image data and the masked lidar data, respectively. At block 872, a joint histogram is generated, and at block 873 a Gaussian blur is applied to the joint histogram formed from the first and second sets of data to reduce noise and high frequency content of the histogram data. In embodiments, a different smoothing filter, other than a Gaussian blur, may be applied to the joint histogram to reduce potential noise in the joint histogram for further processing. At block 874, the mutual information of the two sets of data is determined from the joint histogram, as discussed in reference to FIG. 10. The method 800 may further determine a mutual information cost. The mutual information cost being the negative of the mutual information value, a weighted mutual information value, or a scaled mutual information value. Additionally, a the difference between a current mutual information value, or cost, and a mutual information value, or cost, from a previous iteration of the optimization technique of method 800 may be calculated. For the first iteration the mutual information difference may not be calculated due to a lack of any previously determined mutual information value for calculating a mutual information difference. Alternatively, an initial mutual information difference may be a predefined value and the mutual information difference for the first iteration may be determined using the initial mutual information value, and a current mutual information value determined by the first iteration of the optimization loop 6860.

At block 876, the method 800 determines if one or more exit conditions have been met. If the one or more exit conditions have been met, the method 800 exits the optimization loop 860, the method 800 ends, and the optimized transformation parameters are stored in a memory, communicated to a processor or controller, or communicated to an external device or system via wireless communication, Bluetooth communication, hardwired communication, or other network or communication interface. If at block 876, it is determined that the one or more exit conditions have not been met, then the extrinsic transformation parameters (i.e., the rotational and translation transformation parameters) are updated, at block 878, and the homogenized lidar pixel point cloud is transformed by the updated candidate transformation parameters at block 862, and another iteration of the optimization loop 860 is performed. The optimization loop 860 repeats iteratively updating the candidate transformation parameters and determining mutual information values until the one or more exit conditions have been met, at block 876.

In embodiments, the one or more exit conditions may include achieving a certain mutual information value (e.g., a mutual information value of 1, 10, 20, 50, 100, etc.), achieving a minimum mutual information cost threshold (e.g., a cost threshold of less than 1, less than −1, less than −10, less than −20 etc.), achieving a difference between a mutual information value of a current iteration and a mutual information value of a previous iteration (e.g., a difference threshold of less than 5, less than 1, less than 0.5, less than 0.1, less than 0.05, less than 0.01, etc.), achieving a difference between a cost value of a current iteration and a cost value of a previous iteration (e.g., a difference threshold of less than 5, less than 1, less than 0.5, less than 0.1, less than 0.05, less than 0.01, etc.), performing a number of iterations of the optimization loop 630 (e.g., 10 iterations, 100 iterations, 1000 iterations, etc.), or another exit condition.

In embodiments, the extrinsic parameters may be updated by perturbing the extrinsic transformation parameters of the current iteration by a determined value. For example, the current parameters may be multiplied by a randomly generated value from a weighted Gaussian distribution, Poissonian distribution, exponential distribution, or by another probability distribution or probability density function. In examples, the transformation parameters may be perturbed by a percentage of the current transformation parameter value, for example the transformation parameter may be perturbed by 1%, 5%, 8%, 10%, or 15% or the current transformation parameter value.

In embodiments, the type of perturbation and amount or percentage of perturbation may be determined by the current mutual information value, mutual information cost, a difference of the cost value of a current iteration and the cost value of a previous iteration, or a difference of the mutual information value of a current iteration and the mutual information value of a previous iteration. For example, it may be desirable to perturb the transformation parameters by 15% when the difference of the mutual information value between two consecutive iterations is greater than 10. In subsequent iterations, it may be determined that the perturbation should be reduced to 5% due to a decrease in the difference of the mutual information value between two iterations of the optimization process. Dynamically changing the perturbation during optimization may decrease optimization times, enable greater mutual information values of the determined optimized transformation parameters, and allow for smaller difference in mutual information values between iterations during optimizations.

Figure 14A:
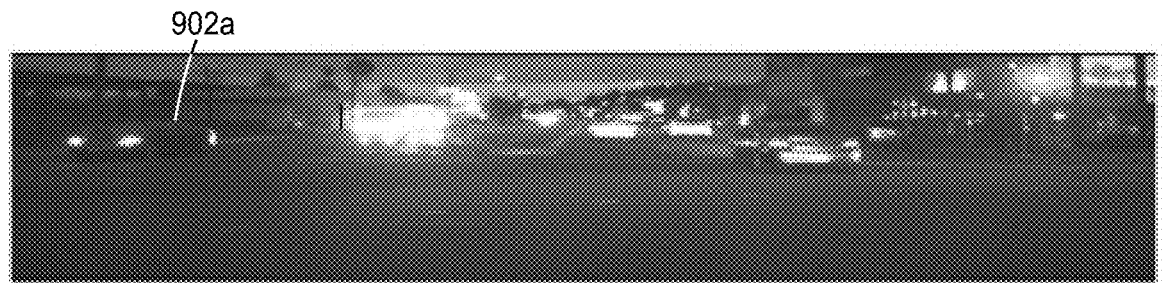
FIG. 14A is an illustration representative of a photographic image of an environment.
Figure 14B:
FIG. 14B is an illustration representative of a lidar point cloud of the environment of FIG. 14A.
Figure 14C:
FIG. 14C is an illustration representative of the combined photographic image of FIG. 14A and transformed lidar point cloud of FIG. 14B after optimization of the lidar point cloud transformation.

FIGS. 14A, 14B, and 14C are illustrations of a photographic image, a lidar point cloud, and the resultant image of the combined photographic image and transformed lidar point cloud after optimization of the lidar point cloud transformation. It is apparent by the difference of the location of feature 902a in FIG. 14A, and the same feature 902a in FIG. 14B that the photographic camera and the lidar system have different fields of regard. Additionally, the size of the features in FIG. 14A differ from the sizes of the features of FIG. 14B. FIG. 14C shows the combination of the lidar data and the photographic data after an optimization of the transformation parameters has been performed (e.g., by the optimization methods described in reference to FIG. 13). The lidar data (dotted lines) has been transformed to match the features of the image data.

The accurate mapping of and combination of lidar and camera data allows for target identification using the camera data, and distance information using the lidar data for use in providing feedback to an automobile, and more specifically, for enabling autonomous operation of a vehicle. Similarly, the combined data may be provided to a user of a vehicle to better assist with manual driving of the vehicle. Additionally, the method 800 of FIG. 13 may assist in calibrating one or more sensors associated with a vehicle. As described in reference to FIGS. 11A and 11B, sensors associated with a vehicle may physically shift over time due to many factors such as vehicle or sensor collisions, shifting due to the vibrations and forces associated with driving, or a number of other reasons. As such, the optimized transformation parameters may also change over time due to the change of the fields of view of sensors. It may be determined that the optimized transformation parameters have reached a threshold value and that a physical calibration of a sensor is required. The data from the sensor may then be determined invalid for use in providing information to a user of the vehicle, or for use in enabling autonomous operation of the vehicle. Additionally, the physical calibration of the sensor may be performed manually (e.g., by a mechanic, technician, user of the vehicle, or other agent) or automatically (e.g., by a controller and actuators, motors, or other physical adjuster).

Additional Options and Embodiments

While the transformation parameters and optimization methods have been described herein in reference to combining lidar data from multiple lidar sensors, or lidar data with photographic camera data, the methods and systems described herein may be useful for combining data sets from any two sensors with overlapping fields of regard. For example, other combinations of data may include combining lidar data with infrared data, photographic image data with radar data, or other types of data indicative of a spatial field of view of a region of interest. Additionally, the optimization techniques disclosed herein may be useful for the combination of two or more data sets including the combination of any of lidar data, photographic image data, radar data, infrared data, GPS data, near infrared data, and/or ultrasonic data obtained from sensors with overlapping fields of regard.

The methods and systems described herein may also be useful for calibrating more than two sensors of a sensor system. In such embodiments the data, or subsets of data (e.g., only data included in an overlapping region of the sensors), from multiple sensors may be projected onto multiple projection planes for calibration of the sensors. For example, a vehicle may have five sensors (e.g., the car illustrated in FIGS. 6A and 6B) that each have field of regard overlap with at least one other sensor of the sensor system. Transformation optimization and calibration, as described herein, may be performed for each pair of adjacent sensors having a field of regard overlap region. Additionally, the combination of the transformed data sets from all five sensors may allow for a 360-degree field of regard of the sensor system. In embodiments that employ more than two sensors, one of the sensors may be designated as a master sensor and data sets from the other sensors may all be transformed into the reference frame of the master sensor. For example, sensor 308A may be designated as the master sensor, and the optimization and calibration techniques described herein may be performed to determine the optimized transformation parameters, $T_A^B$, for transforming data, or a subset of data, from sensor 308B into sensor 308A's reference frame. That is, $P'_B=[T_A^B]P_B$, with $P_B$ being the original data from sensor 308B, $T_A^B$ being the optimal transform from sensor 308B's frame of reference to sensor 308A's frame of reference, and $P'_B$ being the transformed data.

Optimal transformation parameters for sensor 308C may then be determined by first transforming the data from sensor 308C to the reference frame of sensor 308B, and then performing the transformation from 308B's reference frame to sensor 308A's reference frame. That is, $P'_C=[T_A^B][T_B^C]P_C$, with $P_C$ being the original data, or a subset of data, from sensor 308C, $T_B^C$ being the optimal transform from sensor 308C's frame of reference to sensor 308B's frame of reference, and $P'_C$ being the transformed data. Additionally, multiple overlap regions of the fields of regard may be used to check the calibration of the five sensors 308A-E. for example, transforming data, or a subset of data, from sensor 308D to the frame of reference of sensor 308A, via transformations through sensor 308C's frame of reference, and 308B's frame of reference should result in the same transformed data, as transforming data from sensor 308B to the frame of reference of sensor 308A through the frame of reference of sensor 308E. That is, the transformation $[T_A^B][T_B^C][T_C^D]$ should be approximately equal to $[T_A^E][T_E^D]$. The ability to perform multiple calibrations through multiple transformations allows for more robust calibrations of the sensors in a multi-sensor system, more precise calibrations, and provides multiple methods for catching failures of sensors in a multi-sensor system.

In embodiments, a region of overlap may be determined through image processing, through predefined means, through user input, or by another system. The transformation optimization methods described herein may then be performed only for the data from each of the sensors that represents pixels in the overlap region. Such embodiments could reduce the processing time for performing the optimization, reduce the computational resources dedicated to the optimization, and/or reduce memory requirements for a system for performing the optimization.

In embodiments, the data obtained by the sensors may include static data or "snapshots" captured in a static environment where nothing is moving. In other embodiments, dynamic data may be captured by the sensors while a vehicle is moving, or objects in sensor fields of regard or observed environments are moving. In embodiments with moving objects, the moving objects may be identified and removed from the image data (e.g., photographic image data, lidar pixel data, etc.) before the transformation optimization techniques described herein, and perform. To identify moving objects, the speed or velocity of the lidar sensor or camera may be considered to determine which identified objects are in fact stationary (e.g., a parked car, a sign, the road, a barrier, a tree, etc.) and which objects and moving (e.g., traffic, an animal, etc.).

Capturing data in a dynamic environment or from a moving vehicle may be referred to as "smart scene selection," which may include capturing images and selecting parts of an image, or a scene, that are to be used for sensor calibration and the optimization methods described herein. Smart scene selection may be performed only when a vehicle having multiple sensors, is stopped (e.g., parked, at a stop light, at a stop sign, etc.). Additionally, smart scene selection may be performed when a majority of objects within a scene are static such as driving through a forest on a deserted road, or along a roadway at night with little traffic or pedestrian movement.

For lidar-to-camera calibration, or any transformation optimization involving photographic image data, smart scene selection may include capturing data when there are few or no shadows in the image, as shadows may cause complications in identifying and mapping pixels as described herein. Smart scene selection may be implemented by determining a cost value of the captured data. For example, a cost value may be determined by weighing of one or more factors including any of identifying a number of moving objects in a scene, identifying a number of static objects in a scene, determining an amount of specular reflections in a scene, etc. Performing dynamic data capturing and smart scene selection may allow the calibration of sensors in a sensor system to be performed at any time and allows for the capturing of data from a wider variety of scenes that may include both static and moving objects.

In some embodiments, smart scene selection may be implemented based on an amount of correlation between sensor data received from a first and second sensor. If the correlation between the sensor data is high, indicating that the data from the two sensors has a good amount of information overlap (e.g., both sets of data include similar features or objects), then the sensor data may be used in a calibration process. Otherwise, if the data from two sensors is not well correlated, the data may be rejected and not used in a calibration process. The correlation between sensor data received from two sensors may be based on a correlation score that quantifies an amount of correlation or information overlap between the two sets of sensor data. A correlation score may be determined using any suitable technique. For example, a correlation score may be based on a normalized information distance (NID), which may have a value from 0 to 1. The correlation score between two sets of sensor data may represent a measure of similarity between the two data sets. For example, two sets of data may have a relatively high correlation score (e.g., a score above 0.7) if each set of data includes one or more of the same objects. Two sets of sensor data may include the same object observed from different perspectives such that errors in calibration are apparent, and the two sets of data may have a relatively high correlation score. The correlation score may be less than one, since the different perspective of each set of data may give rise to some difference between the information contained in the two sets of data. If the correlation score between two sets of sensor data is greater than a particular threshold value (e.g., 0.7), then the sensor data may be used in a calibration process.

The calibration processes described herein may be applied using single frames of data or multiple frames of data. For example, the lidar-lidar calibration process illustrated in FIG. 10 may use a single point cloud of lidar data received from each of two sensors to perform the calibration. Alternatively, multiple point clouds of lidar data from each of two sensors may be used to perform the calibration. The multiple point clouds may include point clouds obtained at different times while the lidar sensors are in operation. Additionally or alternatively, the multiple point clouds may include multiple projections of point cloud data (e.g., data from a single point cloud that is projected onto two or more projection planes). For a calibration process that uses multiple frames of data, the data frames may be analyzed separately (e.g., a joint histogram and a corresponding value of mutual information may be determined for each pair of data frames from the respective two sensors), or the data frames may be combined and analyzed together (e.g., a single joint histogram corresponding to all the frames of data may be generated, and one corresponding value for mutual information may be determined from the single joint histogram).

Once a set of transformation parameters is determined, subsequent sensor data received from two or more sensors can be overlapped or combined together using the transformation parameters. In some embodiments, a health score for the transformed sensor data can be used to measure or monitor the health or performance of the sensors. Over time or with a change in ambient temperature, the calibration of the sensors may degrade (e.g., due to slight movement or misalignment of optical components within a sensor) or the transformation parameters may no longer successfully overlap the data (e.g., due to coarse movement, failure, or breakage of a part within a sensor). By determining a health score that corresponds to how well the data received from two or more sensors is overlapped, the health or performance of the sensors may be monitored. A health score may be based on one or more of a metric of mutual information, a cost value, or a NID value, and the health score may be determined from a first set of data and a transformed second set of data. After performing a transformation using a set of transformation parameters, a health score (e.g., a metric of mutual information) may be determined, and if the health score is greater than or less than a particular threshold value, then the sensors may be in need of recalibration, service, or repair. For example, if the metric of mutual information between a first set of data and a transformed second set of data is less than a recalibration-threshold value, then this may indicate that the sensors are in need of being recalibrated. A notification may be sent indicating that a new set of transformation parameters needs to be determined. As another example, if the metric of mutual information is less than a critical-threshold value (e.g., where the critical-threshold value is less than the recalibration-threshold value), then this may indicate that there is a problem with the sensor system (e.g., a part has broken or moved). In this case, a notification may be sent indicating that the sensors are in need of service or repair. Additionally, the sensor system may be shut down or taken out of service until the service or repair is performed.

In embodiments, a calibration may be performed using sensor data from multiple lidar sensors having different projection planes, referred to in this disclosure as multi-view projections. The multi-view projections may include lidar data sets with top-down projections, front projections, and/or side projections. The lidar data from two or more different projection planes may allow for better detection of sensor alignments/misalignments and for determining whether a sensor should be recalibrated. Single-view projection calibrations can minimize or de-emphasize certain details of spatial data that depend on certain dimensions of an object in a field of regard. For example, a small lateral shift in an object as viewed from a front projection may not be as apparent as the same shift when viewed from a top-down or side projection. By performing multiple projections an object can be viewed from multiple viewpoints, which provides potentially different information to be collected and analyzed for calibration. Implementing multi-view projections allows for data offsets that could otherwise be missed or de-emphasized by a single view. Multi-view projection calibration may be useful for lidar-to-lidar sensors in which 3-D data sets (x, y, z) is available.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A method for processing data received from sensors, the method comprising:
   receiving, by processing hardware from a first sensor, first sensor data corresponding to an environment detected in a field of regard (FOR) of the first sensor;
   receiving, by the processing hardware from a second sensor having a physical offset in position and/or orientation from the first sensor, second sensor data corresponding to the environment detected in a FOR of the second sensor at least partially overlapping the FOR of the first sensor; and
   determining, by the processing hardware, a set of transformation parameters for alignment of the first sensor data and the second sensor data, including iteratively modifying candidate transformation parameters in view of a metric of mutual information between the first sensor data and the second sensor data, wherein determining the metric of mutual information includes generating a joint histogram between the first sensor data and the second sensor data for a region of overlap between the FOR of the first sensor and the FOR of the second sensor.

2. The method of claim 1, wherein:
   receiving the first sensor data includes receiving a two-dimensional image made up of pixels each including a respective intensity value; and
   receiving the second sensor data includes receiving a three-dimensional point cloud made up of points each including a set of spatial coordinates and a respective intensity value.

3. The method of claim 2, wherein the metric of mutual information indicates correlation between the intensity values in the first sensor data and the intensity values in the second sensor data.

4. The method of claim 1, wherein:
   receiving the first sensor data includes receiving a first three-dimensional (3D) point cloud made up of points each including a set of spatial coordinates; and
   receiving the second sensor data includes receiving a second 3D point cloud made up of points each including a set of spatial coordinates; and
   wherein the metric of mutual information indicates correlation between the set of spatial coordinates in the first sensor data and the set of spatial coordinates in the second sensor data.

5. The method of claim 4, wherein:
   each of the points in the first 3D point cloud and in the second 3D point cloud further includes a respective intensity or reflectivity value; and
   the metric of mutual information further indicates correlation between the intensity values in the first sensor data and the intensity values in the second sensor data.

6. The method of claim 5, further comprising applying a first weight to the sets of spatial coordinates and a second weight to the intensity values when generating the metric of mutual information.

7. The method of claim 1, wherein the set of transformation parameters include at least one of rotation or translation offsets.

8. The method of claim 1, wherein iteratively modifying the candidate transformation parameters includes:
   setting, by the processing hardware, a candidate set of transformation parameters to an initial set of the transformation parameters;
   transforming, by the processing hardware, the second sensor data into a reference frame of the first sensor data, in accordance with the candidate set of the transformation parameters;
   calculating, by the processing hardware, the metric of mutual information for the first sensor data and the transformed second sensor data; and
   repeating the transforming and the calculating, for different respective candidate sets of transformation parameters, until an exit condition is satisfied.

9. The method of claim 8, further comprising:
   receiving the initial set of transformation parameters from an operator via a user interface.

10. The method of claim 8, further comprising:
    selecting a result of a previous calibration process as the initial set of transformation parameters.

11. The method of claim 8, further comprising:
    selecting the initial set of transformation parameters using a grid search that yields an overlap between the FOR of the first sensor and the FOR of the second sensor above a certain threshold value.

12. The method of claim 8, wherein transforming the second sensor data includes applying a homogeneous transformation matrix, wherein the homogeneous transformation matrix is based on a rotation quaternion and/or a translation vector.

13. The method of claim 8, wherein calculating the metric of mutual information includes:
    determining a region of overlap between the FOR of the first sensor and the FOR of the second sensor, and
    determining the metric of mutual information only for the region of overlap.

14. The method of claim 8, further comprising
    repeating the transforming and the calculating includes maximizing the metric of mutual information based on the joint histogram.

15. The method of claim 8, wherein repeating the transforming and the calculating includes:

applying, by the processing hardware, a gradient-descent algorithm to the candidate set of transformation parameters to generate an updated candidate set of transformation parameters.

16. The method of claim 15, wherein the gradient-descent algorithm conforms to a Barzilai-Borwein method.

17. The method of claim 8, wherein repeating the transforming and the calculating includes:
applying, by the processing hardware, a gradient-free algorithm to the candidate set of transformation parameters to generate an updated candidate set of transformation parameters.

18. The method of claim 17, wherein the gradient-free function conforms to a Nelder-Mead optimization method.

19. The method of claim 8, wherein the exit condition corresponds to at least one of:
(i) the metric of mutual information exceeding a first predefined threshold value,
(ii) a cost value based on the metric of mutual information being below a second predefined threshold value,
(iii) a number of iterations of the transforming and the calculating exceeding a third predefined threshold value,
(iv) a difference between a cost of a current iteration and a cost of a previous iteration being below a fourth predefined threshold value.

20. The method of claim 1, wherein the joint histogram includes a two-dimensional grid of values, wherein each axis of the grid represents intensity or depth data from one of the sensors, and each value of the grid corresponds to a probability or a number of times that a corresponding sample pair of data from the two sensors is observed in the region of overlap.

21. The method of claim 1, wherein determining the metric of mutual information further includes:
applying a smoothing filter to the joint histogram; and
calculating the metric of mutual information by applying a probabilistic technique to values of the joint histogram.

22. The method of claim 1, wherein each of the first sensor data and the second sensor data includes multiple frames captured by the respective sensor.

23. The method of claim 1, wherein:
receiving the first sensor data includes receiving a first 3D point cloud; and
receiving the second sensor data includes receiving a second 3D point cloud;
the method further comprising:
generating a plurality of projections of the first 3D point cloud and the second 3D point cloud onto respective projection planes;
generating a respective metric of mutual information for each of the projection planes, wherein the metric of mutual information for a projection plane indicates correlation between (i) a subset of spatial coordinates related to the projection plane in the first sensor data and (ii) a subset of spatial coordinates related to the projection plane in the second sensor data.

24. The method of claim 1, further comprising:
identifying, by the processing hardware, dynamic objects captured by the first sensor data and the second sensor data; and
removing, by the processing hardware, dynamic objects from the first sensor data and the second sensor data so as to limit the determining of the set of transformation parameters to static objects only.

25. The method of claim 1, wherein:
the first sensor and the second sensor operate in a vehicle; and
the first sensor data and the second sensor data are captured when the vehicle is stopped.

26. The method of claim 1, further comprising selecting sensor data from the first and second sensors based on a correlation score corresponding to an amount of correlation between the sensor data from the first and second sensors, wherein the data from the first and second sensors is selected if the correlation score exceeds a particular threshold value.

27. The method of claim 1, further comprising:
receiving an additional set of first sensor data from the first sensor and an additional set of second sensor data from the second sensor; and
merging the additional set of second sensor data with the additional set of first sensor data in accordance with the determined set of transformation parameters.

28. The method of claim 1, further comprising:
receiving an additional set of first sensor data from the first sensor and an additional set of second sensor data from the second sensor;
transforming the additional set of second sensor data in accordance with the determined set of transformation parameters; and
determining a health score, wherein the health score is based at least in part on: (i) an additional metric of mutual information associated with the additional set of first sensor data and the transformed additional set of second sensor data, (ii) a cost value associated with the additional set of first sensor data and the transformed additional set of second sensor data, or (iii) a normalized information distance (NID) value associated with the additional set of first sensor data and the transformed additional set of second sensor data.

29. The method of claim 28, further comprising:
determining that the health score is less than a recalibration-threshold value; and
in response to the health score being less than the recalibration threshold value, sending a notification that a new set of transformation parameters needs to be determined.

30. The method of claim 28, further comprising:
determining that the health score is less than a critical-threshold value; and
in response to the health score being less than the critical-threshold value, sending a notification that the first or second sensor needs to be serviced or repaired.

* * * * *